US008531321B1

(12) United States Patent
Rossato et al.

(10) Patent No.: US 8,531,321 B1
(45) Date of Patent: Sep. 10, 2013

(54) SIGNAL PROCESSING AND INHERITANCE IN A TIERED SIGNAL QUALITY HIERARCHY

(76) Inventors: Luca Rossato, Milan (IT); Guido Meardi, Milan (IT)

( * ) Notice: Subject to any disclaimer, the term of this patent is extended or adjusted under 35 U.S.C. 154(b) by 48 days.

(21) Appl. No.: 13/188,226

(22) Filed: Jul. 21, 2011

(51) Int. Cl.
*H03M 7/38* (2006.01)

(52) U.S. Cl.
USPC .......................................... 341/51; 375/240.01

(58) Field of Classification Search
USPC ............ 341/51; 375/240.01, 240.11, 240.13; 382/237; 386/117
See application file for complete search history.

(56) References Cited

U.S. PATENT DOCUMENTS 4,122,440 A 10/1978 Langdon, Jr. et al.
2006/0053004 A1* 3/2006 Ceperkovic et al. .......... 704/221
2008/0120676 A1* 5/2008 Morad et al. .................. 725/127
2008/0211901 A1 9/2008 Civanlar et al.

OTHER PUBLICATIONS

Schwartz, et al., "Overview of the Scalable Extension of the H.264/MPEG-4 AVC Video Coding Standard", Oct. 6, 2006, pp. 1-20.
Marpe, et al., "Context-Based Adaptive Binary Arithmetic Coding in the H.264/AVC Video Compression Standard", Apr. 10, 2003, pp. 620-636.
Fuldseth, A., "Replacing Slices with Tiles for High Level Parallelism", Jan. 2011, pp. 1-4.
Shin, et al., "Rate Control Using Linear Rate-p model for H.264", Dec. 1, 2003 , pp. 341-352.
PCT Search Report, PCT/IB2012/053725, Feb. 15, 2013, pp. 7.
Electronics Letters, "New Method for Representing Linear Quadtree", Jan. 19, 1989, vol. 25, No. 2, pp. 137-139.
Song, et al., "Progressive Compression of Point Texture Images", Visual Communications and Image Processing 2004, pp. 1159-1168.
Wolf, et al., Performance Evaluation of Adaptive Residual Interpolation, a Tool for Inter-layer Prediction in H.264/AVC Scalable Video Coding, SCI 2007, pp. 740-749.
Hunter, et al., "Breadth-First Quad Encoding for Networked Picture Browsing", Computer and Graphic, vol. 13, No. 4, 1989, pp. 419-432.
Ammar, et al., "Switched SVC Up-Sampling Filter", Jan. 14-20, 2006, pp. 1-6.
Beermann, Markus, "Non-Linear up-sampling for spatial scalability", Jul. 17-21, 2006, pp. 1-8.
Weiwei, et al, "An Adaptive Interpolation Scheme for Inter-layer Predicition", 2008 IEEE, pp. 1747-1750.

* cited by examiner

*Primary Examiner* — Joseph Lauture
(74) *Attorney, Agent, or Firm* — Chapin IP Law, LLC

(57) ABSTRACT

A signal processor is configured to encode a signal in a hierarchy including multiple levels of quality. The signal processor produces a rendition of the signal for at least a first level of quality. The signal processor generates sets of reconstruction data specifying how to convert the rendition of the signal at the first level of quality into a rendition of the signal at a second (higher) level of quality in the hierarchy, potentially leveraging on available reference signals. According to one arrangement, the signal processor utilizes an entropy encoder to encode the reconstruction data. Based on probability distribution information for one or more symbols in each set of reconstruction data and based on probability distribution information and/or other encoding parameters inherited from previous levels of quality, the entropy encoder encodes the reconstruction data into an encoded value or bit string. Using the probability distribution information, an entropy decoder converts the encoded value or bit string back into the reconstruction data.

38 Claims, 13 Drawing Sheets

SIGNAL PROCESSING AND INHERITANCE IN A TIERED SIGNAL QUALITY HIERARCHY

RELATED APPLICATIONS

This application is related to U.S. patent application Ser. No. 13/188,188 entitled "INHERITANCE IN A TIERED SIGNAL QUALITY HIERARCHY," filed on the same day as the present application, the entire teachings of which are incorporated herein by this reference.

This application is related to U.S. patent application Ser. No. 13/188,201 entitled "TIERED SIGNAL DECODING AND SIGNAL RECONSTRUCTION," filed on the same day as the present application, the entire teachings of which are incorporated herein by this reference.

This application is related to U.S. patent application Ser. No. 13/188,207 entitled "SIGNAL PROCESSING AND TIERED SIGNAL ENCODING," filed on the same day as the present application, the entire teachings of which are incorporated herein by this reference.

This application is related to U.S. patent application Ser. No. 13/188,220 entitled "UPSAMPLING IN A TIERED SIGNAL QUALITY HIERARCHY," filed on the same day as the present application, the entire teachings of which are incorporated herein by this reference.

This application is related to U.S. patent application Ser. No. 13/188,237 entitled "TRANSMISSION OF RECONSTRUCTION DATA IN A TIERED SIGNAL QUALITY HIERARCHY," filed on the same day as the present application, the entire teachings of which are incorporated herein by this reference.

BACKGROUND

CPU (Central Processing Unit) efficiency matters both during encoding and decoding of a signal. Latest generation processors are becoming more and more parallel, with up to hundreds of simple cores on each single chip.

Unfortunately, by nature, traditional MPEG (Moving Pictures Expert Group) family codecs are structurally non-parallel. That stems from the fact that they are block-based, and each image block must be encoded and decoded sequentially, since to achieve efficient compression all blocks must be made to depend in some way on each other.

Via the introduction of so-called "slices" (basically, pieces of the image that are treated independently of one another, as if they were separate videos put one next to the other) into MPEG coding, the H.264 standard allows for processing of a few threads in parallel (typically 2 or 3 threads). Important algorithm elements such as de-blocking (i.e., a filter that "smoothes" the transitions among blocks to create a more uniform image) are typically global operations full of conditional instructions, which are unsuitable for applications including parallel CPUs.

Today's CPUs and GPUs (Graphics Processing Units) are typically very powerful; a single GPU can include several hundreds of computing cores to perform parallel processing of information. When using current technology, larger portions of an image can be stored in a processor cache for processing. The need to fragment images into a multitude of small blocks, which was a driving factor when MPEG was created, as processors from that era could only deal with very small chunks of video data at a time—and then only sequentially—no longer applies to modern CPUs and GPUs. Thus, a large portion of available processing power may go unused when implementing MPEG-like types of encoding/decoding, with blocking artifacts needlessly introduced into the signal.

Also, compared to what was current when MPEG was developed, modern day applications typically require much higher definition video encoding and much higher overall playback quality. In high-definition (HD), high-quality videos, there is a much larger difference between areas with low detail (potentially even out of focus) and areas with very fine detail. This makes the use of frequency-domain transforms such as those used in MPEG even more unsuitable for image processing and playback, since the range of relevant frequencies is getting much broader.

In addition, higher resolution images include a higher amount of camera noise and/or film grain, i.e., very detailed high-frequency pixel transitions that can be quite irrelevant for viewing and require many bits to encode.

Lastly, traditional codecs are ill-suited to perform efficiently with 3D or volumetric imaging, which is becoming more and more important in fields such as medical imaging, scientific imaging, etc.

Most target devices today support different playback resolutions and quality. So-called SVC (Scalable Video Coding), the current MPEG standard for scalability, has not been received favorably by the industry and shows little to non-existent adoption, because it is considered way too complex and somewhat bandwidth inefficient.

Moreover, encoded videos are plentiful; that is, a content provider typically doesn't have the time to customize encoder parameters and experiment with each specific video stream. Currently, content providers dislike that many encoding parameters must be manually tweaked (every time performing an encoding and checking the quality of results) in order to successfully encode a video.

As an alternative to MPEG standards for encoding/decoding, so-called image pyramids have been used for encoding/decoding purposes. For example, using Laplacian pyramids, conventional systems have created lower resolution images using Gaussian filters and then building the pyramid of the differences between the images obtained by upsampling with a rigidly programmed decoder back from the lower resolution levels to the original level.

Use of conventional Laplacian pyramid encoding has been abandoned. One deficiency of such transforms is that the authors were trying to avoid distortions/artifacts in the downsampled image, so they typically used Gaussian filtering, as it is the only type of filter that doesn't add any information of its own. However, the insurmountable problem with Gaussian filtering is that it introduces a blurring effect, such that when upscaling back to higher resolutions, there is a need for an inordinate amount of image correction information to reproduce the original image. In other words, upsampling with conventional filters results in jagged or blurry edges in a reconstructed image. The jagged or blurry edges need to be corrected using a substantial amount of residual data, making such an encoding technique undesirable for use in higher resolution applications.

One of the important components of any signal encoder is the operation currently referred to as "entropy coding". In practice, once the encoding operations and transforms are performed with either lossless or lossy methods, the residuals (i.e., new information that couldn't be derived from data, such as a previous frame in a video signal, which is already available at the decoder) are essentially strings of numbers that must be transmitted, if possible, without any further loss or approximation and with the least possible amount of bits. The lossless data compression schemes through which strings of numbers can be transmitted with the least possible amount of bits are typically referred to as entropy coding. The concept of entropy in a string of numbers/symbols has to do with the intrinsic amount of information that the string of numbers/symbols contains: since not all of the numbers/symbols in the string are different, the more the string contains few symbols (ideally, just one) that are frequently repeated, the fewer bits are necessary to encode the string.

Several methodologies for entropy encoding exist in the literature. Sophisticated entropy coders (such as CABAC, the context adaptive entropy coder introduced with H.264) can reach excellent results at the expense of great computational complexity, while others, such as the technique known as range encoding, can reach similar results only when used with appropriate parameters. In general entropy coders are only as efficient as their estimate of the symbol frequencies in the strings to encode (i.e. of the probability distribution of the symbols, which the decoder must get from the encoder in some way).

Since MPEG-family codecs are block based (i.e., they divide the signal in a number of blocks and essentially analyze/encode each block separately), ideally they would need a separate probability distribution for the residuals of each single block: this of course wouldn't be practical given the very high number of blocks, so they either use standard distributions of probabilities (not custom made for a specific frame, and consequently less efficient in terms of data compression) or adaptive schemes like CABAC (more efficient, but very complex).

Methods and embodiments herein represent an innovative approach to achieve efficient entropy coding results with low computational complexity.

BRIEF DESCRIPTION

Embodiments herein deviate with respect to conventional systems and methods to produce compressed, encoded data in a tiered signal quality hierarchy. For example, certain embodiments herein are directed to unique ways of generating encoded reconstruction data in a hierarchy based on standard entropy encoding techniques. For simplicity of implementation and efficiency of compression, the present patent application describes embodiments leveraging range encoding techniques, although the approaches covered herein can be applied also with several other types of entropy encoders.

More specifically, one embodiment herein includes a signal processor configured to encode a signal in a hierarchy including multiple levels of quality. To this end, the signal processor produces a rendition of the signal for at least a first level of quality. The signal processor generates sets of reconstruction data specifying how to convert the rendition of the signal at the first level of quality into a rendition of the signal at a second (higher) level of quality in the hierarchy. For instance, in accordance with the methods described in related application United States Patent Application entitled "INHERITANCE IN A TIERED SIGNAL QUALITY HIERARCHY", filed on the same day as the present application, the entire teachings of which are incorporated herein by this reference, the sets of reconstruction data specify all the information that is necessary to correct, integrate and complement the data and the rendition of the signal that can be automatically derived ("inherited") from the previous (lower) level of quality.

The signal processor then utilizes an entropy encoder such as a range encoder to encode each set of reconstruction data. Encoding of each set of reconstruction data can include producing a range value (bit string) representative of the reconstruction data being encoded.

In accordance with further embodiments, note that prior to encoding, the signal processor can be configured to analyze each set of reconstruction data to produce probability distribution information indicating a probability distribution of some or all symbols in the reconstruction data. The probability distribution information indicating a probability of one or more symbols in the reconstruction data enables the chosen entropy encoder (e.g., by way of non-limiting examples, range encoding, Huffman encoding, table-based VLC/Variable Length Coding, run-length encoding, etc.) to encode the reconstruction data into a suitable string of bits (e.g., the range value). Subsequent to creating the range value, the encoder stores the range value and the probability distribution information for subsequent decoding of the range value back into the reconstruction data. The entropy coding can represent any of one or more sets of different types of reconstruction data such as parameters of upsampling operations, quantization thresholds, residual data to apply after upsampling from lower levels of quality, residual data to apply after motion compensation of a known reference signal image, adjustments to motion vectors in the dense motion map used for motion compensation, motion zones, spectral information on noise, meta-data, etc.

For each set of reconstruction data, one or more entropy decoder resource(s) such as range decoder(s) decode the encoded values (e.g., the range values) back into the original reconstruction data, based at least in part on the probability distribution information of the one or more symbols in each set of the original reconstruction data. Subsequent to decoding, another resource reconstructs renditions of the signal using the decoded reconstruction data produced by the decoder(s). Reconstruction can be based on the different types of reconstruction data as mentioned above.

The reconstruction data can include any of multiple different types of suitable data for reconstructing, based on a rendition of the signal at a lower level of quality and/or a known/available reference signal (e.g., by way of a non-limiting example, a previous frame in a video), a rendition of the signal at a next higher level of quality. In one embodiment, the reconstruction data includes so-called Intra residual data, indicating adjustments to be made after upsampling the rendition of signal at one level of quality into a rendition of signal at a next higher level of quality. In accordance with another embodiment, the reconstruction data includes metadata such as one or more upsample operations to be applied to upsample the signal from a given level of quality to a next higher level of quality. In accordance with yet another embodiment, the reconstruction data includes adjustments to be made to a dense motion map (i.e., a map containing motion vectors for all signal elements) obtained by upsampling with suitable operations the motion map used at a lower level of quality; in such embodiment the reconstruction data may also include Inter residual data, indicating adjustments to be made to the reconstructed signal after motion-compensating the known reference signal by means of the above mentioned dense motion map. In one example embodiment, the amount of information needed for the sets of reconstruction data can be reduced by avoiding to specify information with regards to what can be automatically derived ("inherited") from the previous (lower) levels of quality.

As previously mentioned, for each set of reconstruction data the encoder can identify probability distribution information indicating a probability of one or more symbols in the reconstruction data (which can be represented as a string of symbols) to be encoded. The entropy encoder produces at least one decoding parameter to be used by a respective entropy decoder to extrapolate a probability distribution for multiple symbols in the residual data.

In further embodiments, the entropy encoder specifies more than two parameters to the entropy decoder for decoding of a bit string into the reconstruction data. In such an embodiment, the entropy decoder assumes that the first parameter specifies the percentage of residual data elements in the reconstruction data that are equal to a most common value such as zero. The entropy decoder receiving the parameters assumes that each of N additional parameters indicates the probability of another or next most frequent symbol in the reconstruction data. Based on the N parameters and potentially on other standard parameters, the decoder also extrapolates the probabilities of all the other symbols after the Nth symbol. The probability distribution information provides a basis for decoding the bit string back into the original reconstruction data.

In accordance with another embodiment, the entropy encoder specifies two parameters to the decoder for decoding of a bit string into the reconstruction data. In such an embodiment, the first parameter specifies the percentage of symbols (e.g., residual data elements) in the reconstruction data that are equal to a value known to the decoder (e.g., zero). The second parameter includes information enabling the decoder to extrapolate the probabilities for additional symbols in the reconstruction data. The distribution information provides a basis for decoding the bit string back into the original reconstruction data.

In accordance with another embodiment, the encoder specifies one parameter to the decoder for decoding of a bit string into the reconstruction data. In such an embodiment, the one parameter specifies the percentage of residual data elements in the reconstruction data that are equal to a value known to the decoder (such as zero). The decoder then extrapolates the probabilities of all the other symbols based on standard default parameters known to the decoder.

In accordance with further embodiments, each of multiple levels of quality in the hierarchy can be configured to include respective reconstruction data to reconstruct a rendition of the signal at a given level of quality. When suitable to reduce an amount of encoded data, some or all of the reconstruction data at the given level of quality can be leveraged ("inherited") at a next higher level of quality in lieu of having to specify reconstruction data at each level of quality. For example, the entropy decoder can be configured to receive a bit string and, in response to detecting a condition such as that the entropy encoder did not generate any probability distribution parameters for the data or that the entropy encoder at a lower level of quality explicitly indicated that it wouldn't specify any probability distribution parameters for the higher levels of quality, the entropy decoder can utilize the probability distribution parameter(s) used at the previous level(s) of quality to decode the reconstruction data.

Embodiments herein further include a signal processor configured to parse one or more sets of reconstruction data for a given level of quality into multiple groupings of reconstruction data ("tiles"). For instance, when applying tiling to reconstruction data representing residual data, a combination of tiles defines residual data for adjusting elements of a rendition of the signal at the given level of quality, e.g. after upsampling from the lower level of quality or motion-compensating a known reference signal. The encoder produces respective probability distribution parameters for symbols in each of the tiles. The encoder then decides, for each of the tiles, whether to use such probability distribution parameters (which would thus have to be transmitted to the decoder) or the probability distribution parameters automatically inherited from the previous (lower) levels of quality (which would be known to the decoder, with no need of transmitting additional information). The encoder then entropy encodes the multiple groupings of reconstruction data (tiles) into respective bit strings based on the chosen respective probability distribution parameters (either inherited or new) for the groupings. A decoder receives the bit strings and probability distribution values into respective tiles and initiates (optionally parallel) execution of multiple entropy decoders to reproduce the multiple groupings of reconstruction data based on the bit strings and the probability distribution values associated with each tile. The technique of tiling as discussed herein can be used one or more levels of quality in the hierarchy to facilitate parallel processing of entropy encoding/decoding and signal reconstruction.

These and other embodiment variations are discussed in more detail below.

As mentioned above, note that embodiments herein can include a configuration of one or more computerized devices, routers, network, workstations, handheld or laptop computers, or the like to carry out and/or support any or all of the method operations disclosed herein. In other words, one or more computerized devices or processors can be programmed and/or configured to operate as explained herein to carry out different embodiments.

In addition to the encoding/decoding as discussed above, yet other embodiments herein include software programs to perform the steps and operations summarized above and disclosed in detail below. One such embodiment comprises a computer-readable, hardware storage resource (i.e., a non-transitory computer readable media) including computer program logic, instructions, etc., encoded thereon that, when performed in a computerized device having one or more processors (e.g., CPUs, GPUs, etc.) and corresponding memory, programs and/or causes the processor(s) to perform any of the operations disclosed herein. Such arrangements can be provided as software, code, and/or other data (e.g., data structures) arranged or encoded on a computer readable medium such as an optical medium (e.g., CD-ROM, DVD, BD, etc.), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer-readable hardware storage medium having instructions stored thereon for supporting signal processing operations. For example, in one embodiment, the instructions, when carried out by a processor of a respective computer device, cause the processor to: produce a rendition of the signal at a first level of quality; generate at least one set of reconstruction data, the at least one set of reconstruction data specifying how to reconstruct, based on the rendition of the signal at the first level of quality and/or on a known reference signal, a rendition of the signal at a second level of quality in the hierarchy, the second level of quality being higher than the first level of quality; and utilize an entropy encoder (e.g., by way of non-limiting examples, a range encoder, Huffman encoder, table-based VLC encoder, run-length encoder) to encode different sets of reconstruction data, the entropy encoder producing for each set an encoded value or bit string representative of symbols contained in the reconstruction data.

In another embodiment, representing the decoding side of the embodiment just described, the instructions, when carried out by a processor of a respective computer device, cause the processor to: produce a rendition of the signal at a first level of quality; receive at least one set of encoded values, the at least one set of encoded values—once decoded—specifying how to reconstruct, based on the rendition of the signal at the first level of quality and/or on a known reference signal, a rendition of the signal at a second level of quality in the hierarchy, the second level of quality being higher than the first level of quality; and utilize one or more entropy decoders (e.g., by way of a non-limiting example, a range decoder, Huffman decoder, table-based VLC decoder, run-length decoder) to decode the encoded values and reproduce the different sets of reconstruction data to be used to reconstruct the signal at a second level of quality.

The ordering of the steps has been added for clarity sake. These steps can be performed in any suitable order.

Other embodiments of the present disclosure include software programs, firmware, and/or respective hardware to perform any of the method embodiment steps and operations summarized above and disclosed in detail below.

Also, it is to be understood that the system, method, apparatus, instructions on computer readable storage media, etc., as discussed herein can be embodied strictly as a software program, as a hybrid of software, firmware, and/or hardware, or as hardware alone such as within a processor, or within an operating system or within a software application, etc.

As discussed above, techniques herein are well suited for use in software, firmware, and/or hardware applications that encode/decode signals. By way of non-limiting examples, the signals encoded/decoded with these techniques can be two dimensional (e.g., pictures, video frames, 2D motion maps, thermal maps, etc.), three-dimensional (e.g., 3D/volumetric images, holographic images, CAT-scans, medical/scientific images, 3D motion maps, etc.), or even feature more than three dimensions. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended that each of the concepts can be executed independently of each other or in combination with each other. Accordingly, the one or more present inventions, embodiments, etc., as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Figure 1:
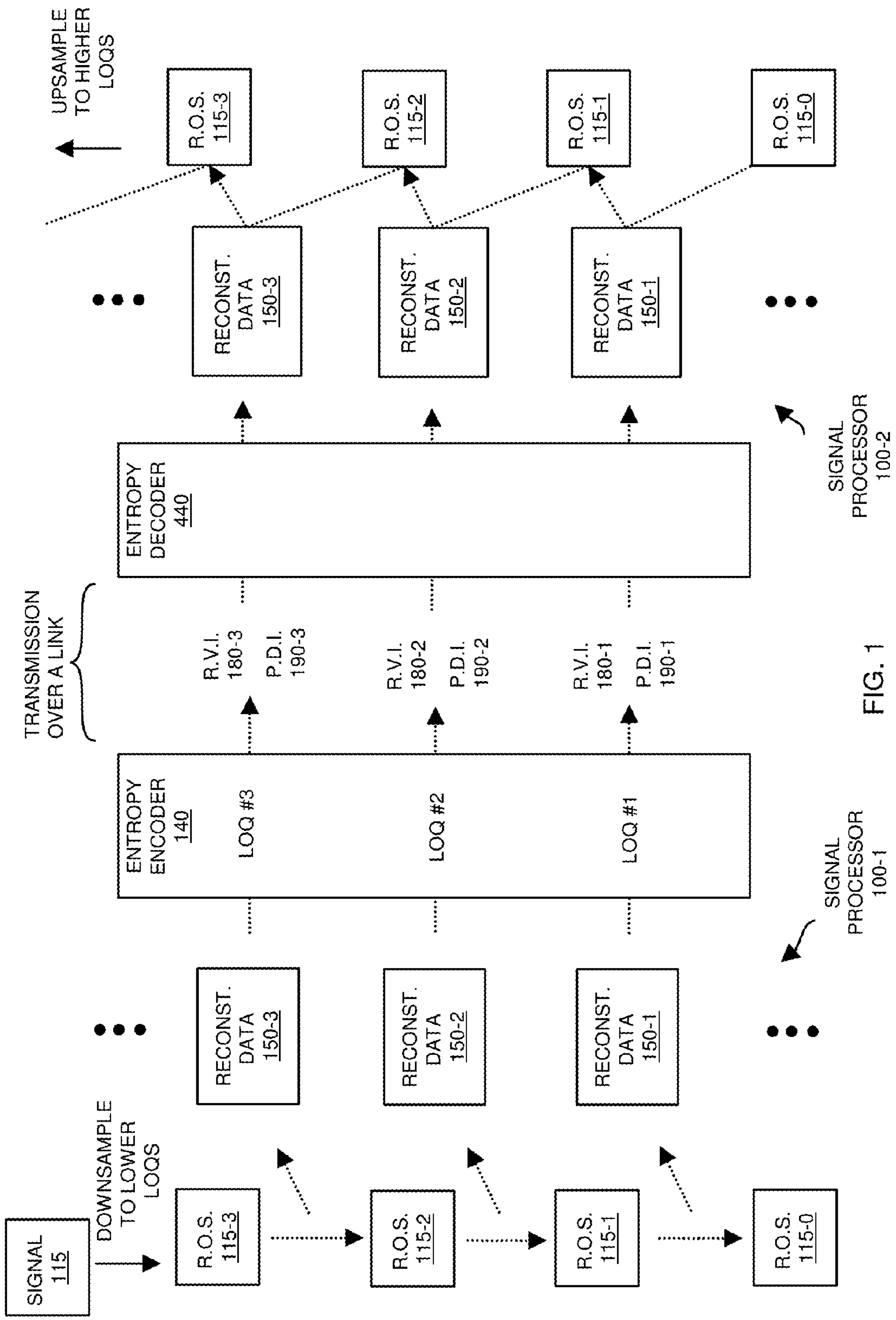
FIG. 1 is an example diagram illustrating encoding/decoding of reconstruction data according to embodiments herein.

FIG. 1 is an example diagram illustrating processing of reconstruction data according to embodiments herein.

As shown, a signal processor 100-1 downsamples a signal 115 into different renditions at lower levels of quality. In general, downsampling the signal 115 can include producing a rendition of the signal at each of different levels of quality and generating reconstruction data specifying how to convert a given rendition of the signal at a first level of quality into a rendition of the signal at a next higher level of quality in the hierarchy.

Note that values associated with the rendition of signal 115 and corresponding rendition of signal at lower levels of quality can represent any suitable type of data information. By way of non-limiting examples, the signal 115 can be image data, a frame or field of a video, a volumetric medical image, a motion map, etc., indicating settings (e.g., color components, motion vectors expressed in rectangular or polar coordinates, temperatures, radioactivity amounts, density values, etc.) of each of multiple signal elements (e.g., pels/plane elements, pixels/picture elements, voxels/volumetric picture elements, etc.) in a respective image.

Each element in the signal 115 can be attributed several settings such as one or more color components. In accordance with such an embodiment, color components of an element in the signal data are encoded in accordance with a suitable color space standard such as YUV, RGB, HSV, etc.

By way of non-limiting examples, the image represented by signal 115 can be two dimensional (e.g., pictures, video frames, 2D motion maps, etc.), three-dimensional (e.g., 3D/volumetric images, holographic images, CAT-scans, medical/scientific images, 3D motion maps, etc.), or even feature more than three dimensions. The settings of the signal elements or components indicate how to represent/display the signal for playback or reproduction on a device.

In accordance with further embodiments, signal 115 represents an original signal or high-resolution signal including multiple elements. In such an embodiment, each of the renditions of signal (e.g., rendition of signal 115-3, rendition of signal 115-2, rendition of signal 115-1, . . . ) can be akin to a thumbnail representation of an original signal that has been downsampled from signal 115 to a lower level of quality.

The renditions of signal 115 at the lower levels of quality capture coarser attributes of the original signal, but not the more detailed finer attributes of the original signal. The detailed, finer attributes appear in the rendition of the signal at higher levels of quality.

By way of a non-limiting example, the signal processor 100-1 downsamples original signal 115 into rendition of signal 115-3; signal processor 100-1 downsamples rendition of signal 115-3 into rendition of signal 115-2; signal processor 100-1 downsamples rendition of signal 115-2 into rendition of signal 115-1; and so on to a lowest level of quality. The signal 115 can be downsampled into any number of suitable levels.

When downsampling the signal 115 to each lower level of quality, the signal processor 110-1 can generate respective reconstruction data 150. Reconstruction data indicates how to reconstruct, based on a rendition of the signal at a lower level of quality and/or a known reference signal (e.g., by way of a non-limiting example, previous frames in a video), a rendition of signal at a next higher level of quality. For example, reconstruction data 150-3 indicates how to convert the rendition of signal 115-2 into the rendition of signal 115-3; reconstruction data 150-2 indicates how to convert the rendition of signal 115-1 into the rendition of signal 115-2; reconstruction data 150-1 indicates how to convert the rendition of signal 115-0 into the rendition of signal 115-1; and so on.

Reconstruction data 150 can be any of multiple different types of data used to reconstruct the signal at higher levels of quality. For example, reconstruction data include any of one or more sets of different types of reconstruction data such as parameters of upsampling operations, quantization threshold information, residual data, motion zones, adjustments to motion vectors, spectral information on noise, meta-data, etc.

Additional example details of downsampling a respective signal and producing reconstruction data is described in related application United States Patent Application entitled "SIGNAL PROCESSING AND TIERED SIGNAL ENCODING,", filed on the same day as the present application, the entire teachings of which are incorporated herein by this reference. In such embodiments, the signal processor 100-1 can be configured to test and create different sets of reconstruction data to upsample from one level of quality to another.

Reconstruction data 150 can include any suitable data for signal processing. For example, each set of reconstruction data 150 can include metadata, residual data, etc. Metadata can include data such as a set of one or more upsampling operations with which to convert the rendition of the signal from one level of quality to the next; the residual data can indicate information such as adjustments to be made to signal elements at the different levels of quality (e.g., after upsampling a rendition of the signal at a lower level of quality, or after motion-compensating a known reference signal at the same level of quality, etc.), and so on.

The signal processor 100-1 can include an entropy encoder 140. In one example embodiment, the entropy encoder 140 processes the reconstruction data at each of multiple different levels of quality into a respective set of range value information 180 and probability distribution information 190.

Range value information 180 can include a respective range value (i.e., bit string representing encoded symbols) generated for a corresponding set of reconstruction data. The probability distribution information 190 can indicate a distribution of one or more symbols in the respective set of reconstruction data 150 being encoded. In one example embodiment, indication of probability distribution information 190 for one or more sets of reconstruction data can be avoided, meaning that for the respective set(s) of reconstruction data the decoder should use the probability distribution information inherited from previous (lower) levels of quality and/or from known reference signals.

In one embodiment, entropy encoder 140 and decoder 440 can be based on the technique known in the art as range encoding, which has good performance and efficiency; however, this is shown by way of non-limiting example only, and any suitable method of entropy encoding or data compression can be used to encode and decode the reconstruction data 150. Regardless of the type of entropy encoding used, methods herein deviate with respect to conventional systems and methods.

The entropy encoder 140 can be configured to produce respective range value information and probability distribution information for each of the different types of reconstruction data.

As a more specific example, the signal processor 100-1 utilizes an entropy encoder 140 to encode the reconstruction data 150-1 into range value information 180-1 and probability distribution information 190-1. For example, the entropy encoder 140 analyzes the sets of reconstruction data 150-1 for level of quality #1 to produce the sets of probability distribution information 190-1. Each set of probability distribution information 190-1 indicates a probability distribution of one or more symbols in the corresponding set of reconstruction data 150-1.

The entropy encoder 140 produces probability distribution information 190-2 for reconstruction data 150-2. The sets of probability distribution information 190-2 indicate a probability distribution of one or more symbols in the sets of reconstruction data 150-2. In one example embodiment, for one or more sets of reconstruction data in one or more levels of quality, the encoder may choose not to produce probability distribution information, meaning that for the corresponding set(s) or reconstruction data the encoder and the decoder should use the probability distribution information automatically inherited from lower levels of quality and/or from a known reference signal.

The signal processor 100-1 utilizes entropy encoder 140 to encode each set of reconstruction data for each level of quality based on the corresponding probability distribution information. For example, the entropy encoder 140 utilizes the probability distribution information 190-1 as a basis to produce range value information 180-1 (i.e., an encoded bit string) representative of reconstruction data 150-1; the entropy encoder 140 utilizes the probability distribution information 190-2 as a basis to produce range value information 190-2 representative of reconstruction data 150-2; the entropy encoder 140 utilizes the probability distribution information 190-3 as a basis to produce range value information 190-3 representative of reconstruction data 150-3; and so on.

The signal processor 100-1 stores the range value information 180 and the probability distribution information 190 for subsequent distribution to one or more target resources. In one embodiment, the encoded information (i.e., the collection of bit strings referred to herein as range value information 180 and/or the probability distribution information 190) can be transmitted over a communication link from a source to a consumer that includes a decoder to reproduce or playback the signal 115. As further discussed below, reproduction of the signal 115 can include decoding of the range value information 180 and probability distribution information 190 at each of one or more levels of quality into respective sets of reconstruction data to reconstruct the signal 115 for playback. The produced rendition of the signal may be of a same or different resolution and identical or nearly identical to the original encoded signal. In other words, for the latter case, the encoding/decoding as discussed herein can be lossless or lossy.

In one embodiment, the signal processor 100-2 receives the range value information 180 (i.e., a collection of bit strings representing the encoded symbols) and the probability distribution information 190 for respective reconstruction data. The signal processor 100-2 implements an entropy decoder 440. The entropy decoder 440 utilizes the probability distribution information 190 to decode the range value information 180 into the reconstruction data.

As mentioned above, subsequent to decoding, the signal processor 100-2 utilizes the reconstruction data 150-1 produced by the decoder 440 to convert the rendition of the signal 115-0 at a first level of quality into the rendition of the signal 115-1 at a next higher level of quality; the signal processor 100-2 utilizes the reconstruction data 150-2 produced by the decoder 440 to convert the rendition of the signal 115-1 into the rendition of the signal 115-2; the signal processor 100-2 utilizes the reconstruction data 150-3 produced by the decoder 440 to convert the rendition of the signal 115-2 into rendition of signal 115-3; and so on.

Note that the signal processor 100-2 need not continue the process of upward conversion and rendition up to the highest level of quality originally present in the signal and encoded by the signal processor 100-1; in fact, the tiered entropy encoding described herein deviates with respect to conventional systems and methods by allowing low-end reproduction devices to decode and reproduce only the portions of the bitstream that they are equipped to deal with. The same advantage applies if the transmission link becomes inadequate, temporarily or definitively, to carry the amount of information associated with the whole bitstream 180; the portions that are able to reach the decoder, e.g., 180-1, 180-2 and so on up to a certain level of quality, can be processed and decoded independently by the signal processor 100-2, thus ensuring reproduction of the signal 115, albeit at a reduced quality, even when the transmission link degrades.

Note again that the sets of reconstruction data can include residual data indicating adjustments to be made after upsampling the rendition of signal at a first level of quality into the rendition of signal at a next higher level of quality, or adjustments to be made to specific signal elements after motion-compensating a known reference signal into a rendition of the signal at a next higher level of quality, or adjustments to be made to the motion map used to motion-compensate a known reference signal into a rendition of the signal at a next higher level of quality, etc. Additional details of a decoder system and of utilizing residual data and upsample operations to upsample for use herein are described in related application United States Patent Application entitled “TIERED SIGNAL DECODING AND SIGNAL RECONSTRUCTION,” filed on the same day as the present application, the entire teachings of which are incorporated herein by this reference. Also, additional details of a method to reduce the amount of reconstruction data to be encoded/decoded by means of inheritance for use herein are described in related application United States Patent Application entitled “INHERITANCE IN A TIERED SIGNAL QUALITY HIERARCHY,” filed on the same day as the present application, the entire teachings of which are incorporated herein by this reference.

One embodiment herein includes reducing an amount of data needed to encode the probability distribution information 190 for each set of reconstruction data. To reduce data that needs to be transmitted to the decoder 440, the entropy encoder 140 can be configured to analyze the probability distribution information in order to include one or more decoding parameters to be used by a respective decoder to extrapolate a probability distribution for multiple symbols in the residual data.

More specifically, in one example embodiment, the encoder 140 analyzes the probability distribution information 190 in order to include multiple decoding parameters including a first parameter and additional parameters. The first parameter specifies a percentage of elements in the reconstruction data (e.g., residual data) that are assigned a first symbol. Each of the additional decoding parameters can indicate a probability of a next symbol present in the reconstruction data (e.g., residual data).

In accordance with another embodiment, the encoder 140 as discussed herein analyzes the probability distribution information for respective reconstruction data in order to produce a first decoding parameter and a second decoding parameter. The first decoding parameter specifies a percentage of elements in the residual data that are assigned a first symbol; the second decoding parameter specifies how to extrapolate probability distribution values for each of multiple other (additional) symbols in the reconstruction data (e.g., residual data). For instance, in one example embodiment, let us say that there are N different symbols in the alphabet used to encode the residual data, and let us call the first decoding parameter $d_1$ and the second decoding parameter $d_2$; the decoder will be able to calculate all the symbol probabilities p(0) to p(N−1) by solving the following system of equations, subject to the constraint that the sum of all probabilities p(0) to p(N−1) must be 1:

$p(0)=d_1$ $p(k)=p(k-1)*d_2$, for k in the range 2 to N−1.

In accordance with yet another embodiment, the encoder 140 produces the probability distribution information for each set of reconstruction data to include only a single decoding parameter indicating a probability for a first symbol in the residual data. The decoder 440 extrapolates probability distributions for the other symbols based on a predetermined set of standard parameters known to the decoder; the extrapolation may be done by calculations or based on table lookups.

In further embodiments, as discussed below, to reduce an amount of data that needs to be transmitted to the decoder for every level of quality, the entropy encoder 140 does not generate any probability distribution information for respective reconstruction data. In such an instance, the decoder 440 uses (“inherits”) probability distribution information from a lower level of quality for each of one or more higher levels of quality to convert the range value information into the reconstruction data.

Figure 2:
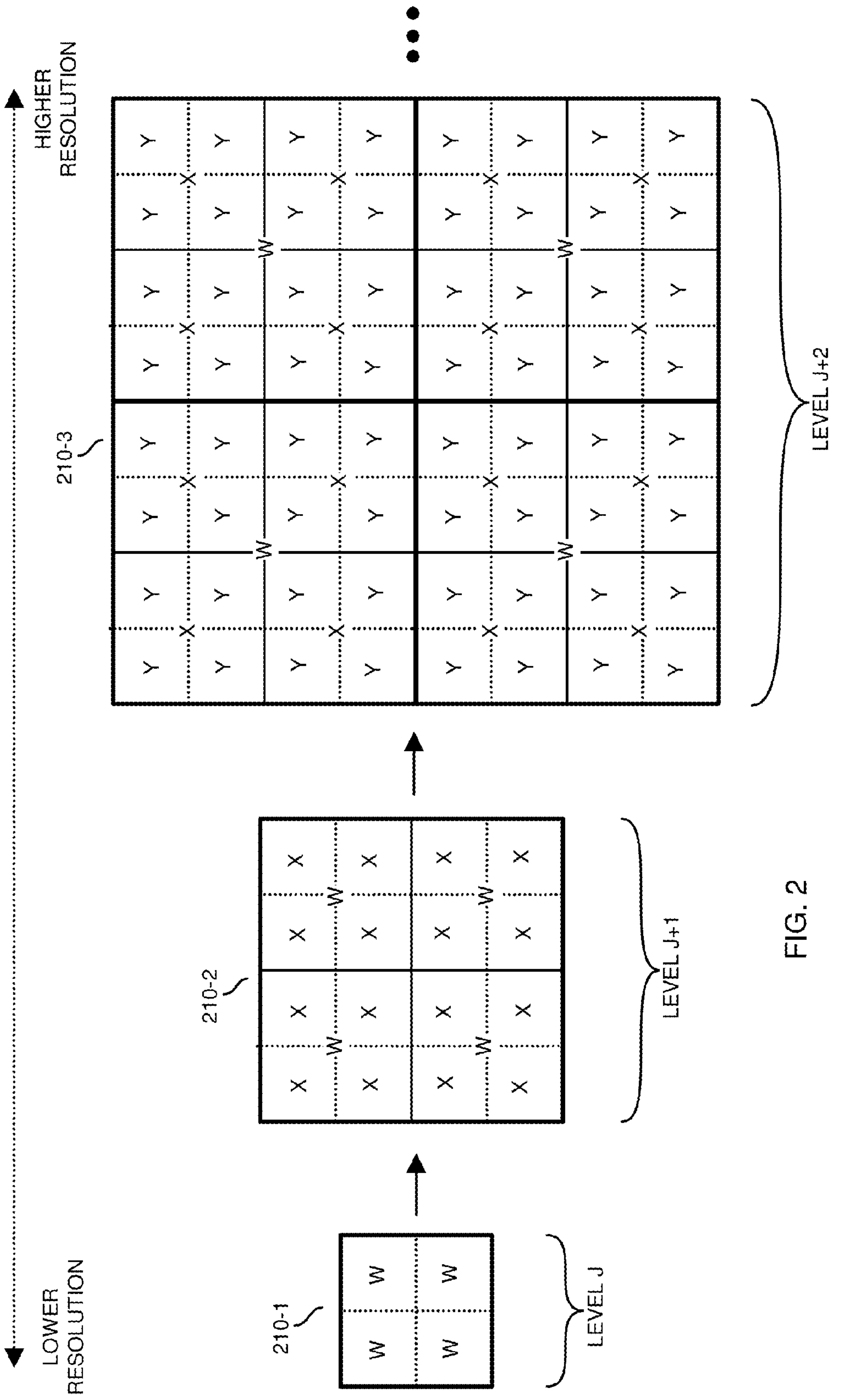
FIG. 2 is an example diagram illustrating upsampling of a signal according to embodiments herein.

FIG. 2 is an example diagram illustrating processing of a signal according to embodiments herein.

As previously discussed, in one embodiment, the signal 115 may represent image information. Assume in this non-limiting example that the signal 115 and corresponding reconstruction data indicate how to convert or expand a lower resolution image into a higher resolution image, with a given scale factor (e.g., in this non-limiting example a scale factor of 2).

Further, assume that the sets of entropy encoded reconstruction data 150, when decoded, indicate how to control settings of image elements at each level of quality. For example, image 210-1 at level of quality J includes a field of image elements W; image 210-2 at level of quality J+1 includes field of image elements X; image 210-3 includes field of image elements Y; etc.

The reconstruction data for level of quality J indicates how to control settings of image elements W in image 210-1 (e.g., rendition of signal 115-0); the reconstruction data for level of quality J+1 indicates how to convert each image element W in image 210-1 into four X elements in image 210-2; the reconstruction data for level of quality J+2 indicates how to convert each image element Y in image 210-2 into four Y elements in image 210-3; and so on. Conversion can include upsampling and filtering (also by means of non-linear operations) followed by making adjustments to elements.

Figure 3:
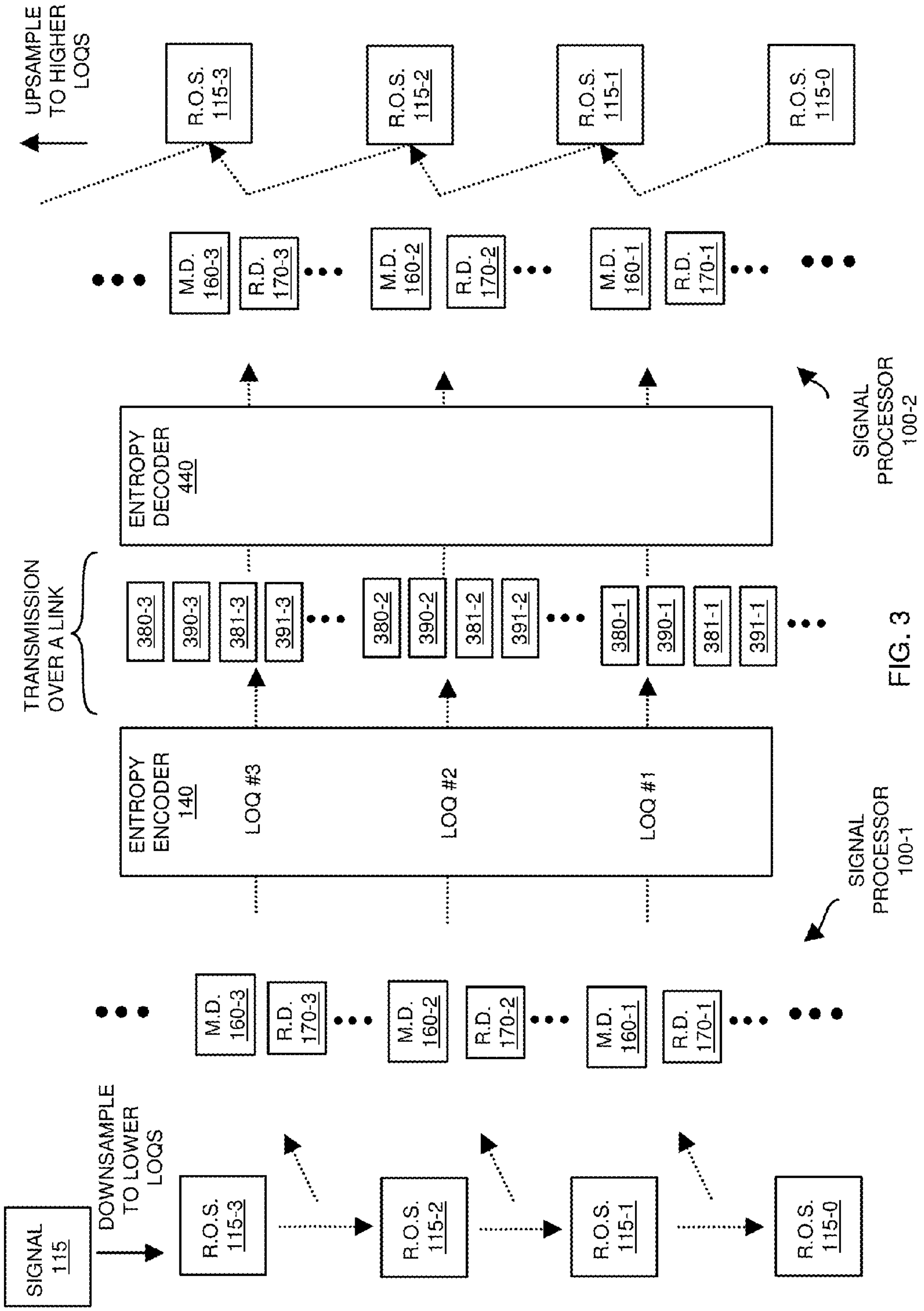
FIG. 3 is an example diagram illustrating processing according to embodiments herein.

FIG. 3 is an example diagram illustrating different examples of processing reconstruction data according to embodiments herein.

As shown, reconstruction data 150-3 can include metadata 160-3, residual data 170-3, etc. Reconstruction data 150-2 can include metadata 160-2, residual data 170-2, etc. Reconstruction data 150-1 can include metadata 160-1, residual data 170-1, etc.

Entropy encoder 140 analyzes metadata 160-1 to produce probability distribution information 390-1, which indicates a distribution of symbols in the metadata 160-1. Entropy encoder 140 further analyzes residual data 170-1 to produce probability distribution information 391-1, which indicates a distribution of symbols in the residual data 170-1.

Entropy encoder 140 analyzes metadata 160-2 to produce probability distribution information 390-2, which indicates a distribution of symbols in the metadata 160-2. Entropy encoder 140 further analyzes residual data 170-2 to produce probability distribution information 391-2, which indicates a distribution of symbols in the residual data 170-2.

Entropy encoder 140 analyzes metadata 160-3 to produce probability distribution information 390-3, which indicates a distribution of symbols in the metadata 160-3. Entropy encoder 140 further analyzes residual data 170-3 to produce probability distribution information 391-3, which indicates a distribution of symbols in the residual data 170-3; and so on.

At times, entropy encoder 140 may decide not to produce probability distribution information 39*-*, in which cases for the corresponding set of reconstruction data the probability distribution information used to encode the corresponding range value will be automatically inherited from lower levels of quality and/or from a known reference signal.

Via some suitable method of entropy encoding (e.g., range encoding, Huffman encoding, table-based VLC/Variable Length Coding, run-length encoding or other similar techniques), the entropy encoder 140 produces range value information 380-1 for metadata 160-1, range value information 381-1 for residual data 170-1, range value information 380-2 for metadata 160-2, range value information 381-2 for residual data 170-2, range value information 380-3 for metadata 160-3, range value information 381-3 for residual data 170-3, and so on.

Entropy decoder 440 utilizes probability distribution information 390-1 to decode range value information 380-1 into metadata 160-1; entropy decoder 440 utilizes probability distribution information 391-1 to decode range value information 381-1 into residual data 170-1.

Entropy decoder 440 further utilizes probability distribution information 390-2 to decode range value information 380-2 into metadata 160-2; entropy decoder 440 utilizes probability distribution information 391-2 to decode range value information 381-2 into residual data 170-2.

Entropy decoder 440 further utilizes probability distribution information 390-3 to decode range value information 380-3 into metadata 160-3; entropy decoder 440 utilizes probability distribution information 391-3 to decode range value information 381-3 into residual data 170-3; and so on.

At times, entropy decoder 440 may not receive probability distribution information 39*-*, in which cases the probability distribution information needed to decode the corresponding range value will be automatically inherited from lower levels of quality and/or from a known reference signal.

Figure 4:
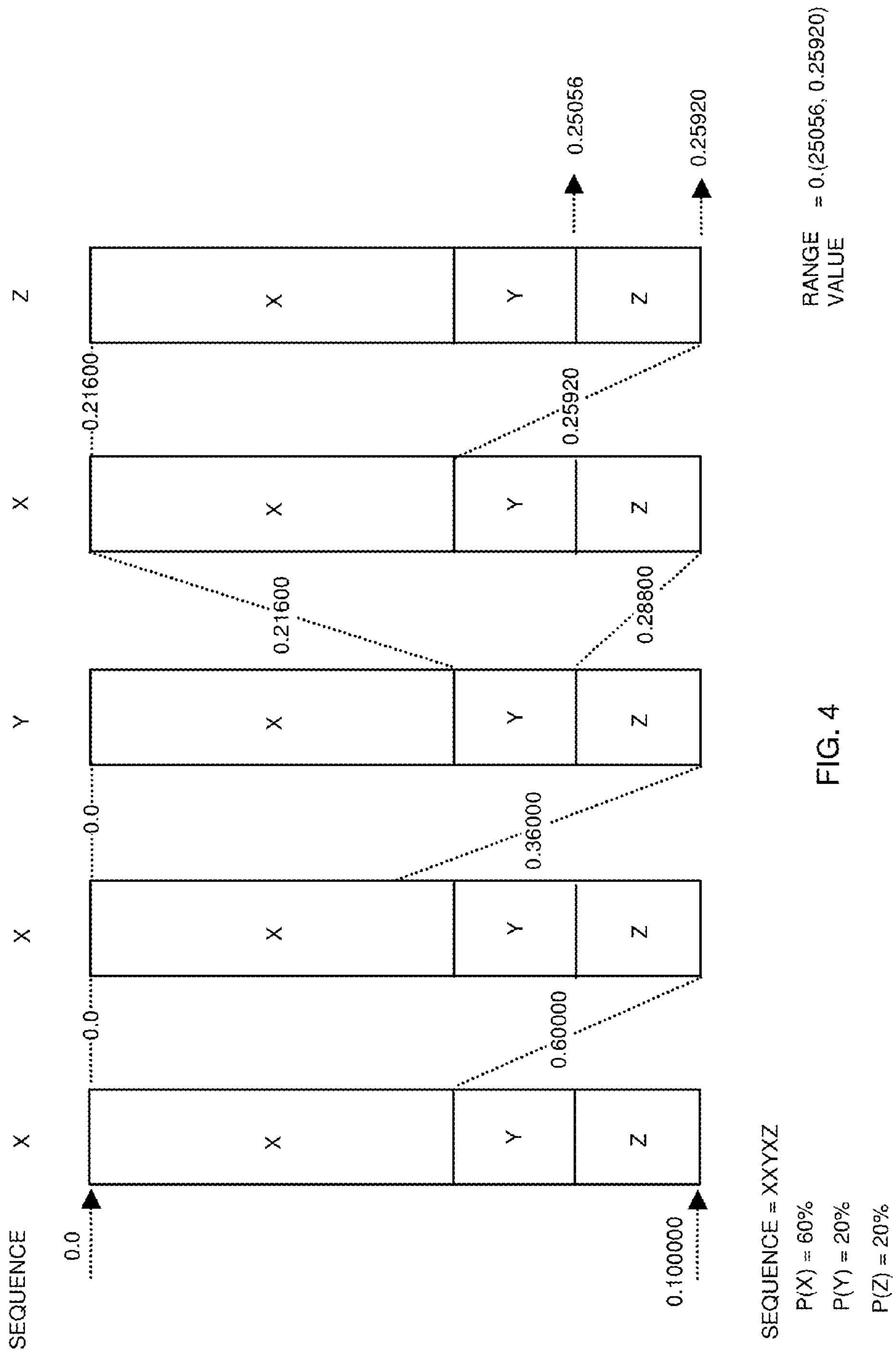
FIG. 4 is an example diagram illustrating an example standard entropy encoding method to encode reconstruction data.

FIG. 4 is an example diagram illustrating an example entropy encoding method to encode reconstruction data, i.e. the industry standard method known as range encoding.

As shown, initially, the entropy encoder 140 selects a range such as 0 to 1 to subdivide according to the symbol probabilities. For a given sequence (e.g., XXYXZ) of symbols of reconstruction data with known length and known alphabet of symbols X, Y, and Z, the entropy encoder 140 produces probability distribution information. In this instance, the probability distribution information indicates that the probability of symbol X in the sequence is 60%, the probability of symbol Y in the sequence is 20%, and the probability of symbol Z is 20%. Based on the probability distribution information and the sequence of symbols, the entropy encoder 140 produces as range value any number included in the range (0.25056, 0.25920). In particular, the encoder will likely choose one of the numbers in the range that require the least amount of bits (e.g., 0.2578125 which can be exactly represented in binary as 0.0100001, with 7 bits after the radix point).

Using the probability distribution information for the sequence, the decoder is able to decode the range value (e.g., binary value 0.0100001, or bit string "0100001") back into the sequence XXYXZ.

This type of range encoding can be used to encode each set of reconstruction data into a respective range value. However, note that the use of 5 symbols is shown by way of non-limiting example only and that each set of reconstruction data may of course include much more than a sequence of 5 symbols (e.g., sequences of tens of thousands of symbols taken from alphabets of hundreds of symbols, or even much more).

Figure 5:
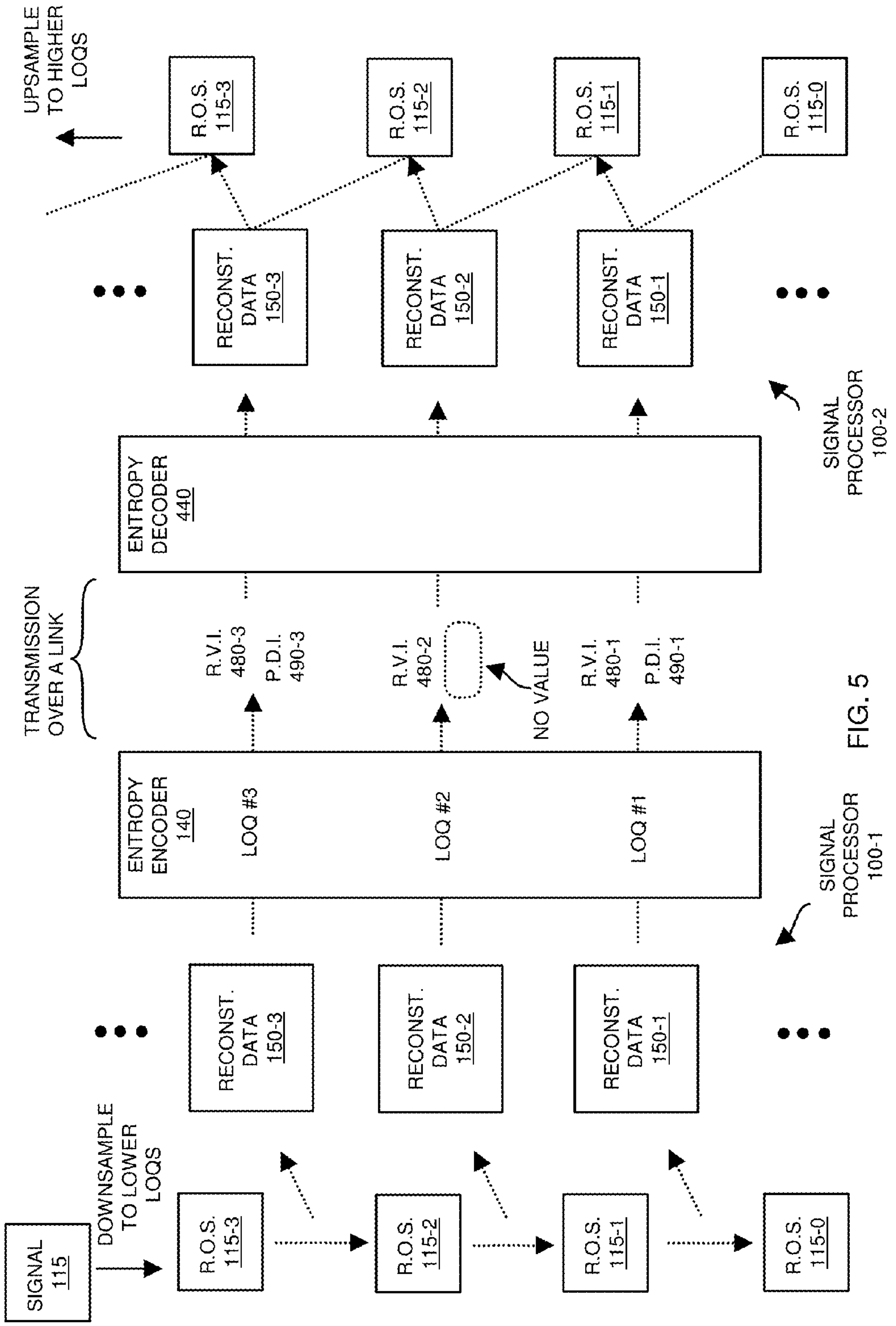
FIG. 5 is an example diagram illustrating encoding and decoding of reconstruction data at multiple levels of quality in a hierarchy according to embodiments herein.

FIG. 5 is an example diagram illustrating use of encoded information at multiple levels of quality in a hierarchy according to embodiments herein.

In this example, the signal processor 100-1 utilizes entropy encoder 140 to encode the reconstruction data into range value information and probability distribution information.

For example, the entropy encoder 140 analyzes the reconstruction data 150-1 (e.g., any of the one or more different types of reconstruction data as discussed herein) for level of quality #1 to produce probability distribution information 490-1. The probability distribution information 490-1 indicates a probability distribution of one or more symbols in the reconstruction data 150-1. Based on the probability distribution information 490-1 and the sequence of symbols in the reconstruction data 150-1, the entropy encoder produces range value information 480-1 in a manner as discussed herein.

Entropy decoder 440 uses probability distribution information 490-1 as a basis to convert the range value information 480-1 into reconstruction data 150-1.

At a next level of quality, the entropy encoder 140 analyzes the reconstruction data 150-2 for level of quality #2 to produce a set of probability distribution information. In this example, based on the analysis, the entropy encoder 140 recognizes that the probability distribution information for reconstruction data 150-2 is substantially similar or equal to the probability distribution information for reconstruction data 150-1. In such an instance, the probability distribution information 490-1 can be reused ("inherited") at level of quality #2, without requiring to store and/or transmit the information that would be needed to specify a new probability distribution.

Reusing the probability distribution information 490-1 at previous level of quality #1 for elements at a higher level of quality (e.g., from rendition of signal 115-1 into rendition of signal 115-2), the entropy encoder 140 generates range value information 480-2. The entropy encoder 140 stores and transmits the range value information 480-2 for level of quality #2 without a corresponding probability distribution information. In other words, the entropy encoder 140 does not send a set of probability distribution information to decoder 440 for the range value information 480-2.

In such an embodiment, the entropy decoder 440 is configured to receive the range value information 480-2. In response to detecting that the entropy encoder 140 did not generate and send a probability distribution information for range value information 480-2, the entropy decoder 440 utilizes the probability distribution information 490-1 (e.g., indicating a probability distribution of one or more symbols in reconstruction data 150-1) to decode the range value information 480-2 into the reconstruction data 150-2. This technique reduces an amount of data that needs to be transmitted to the entropy decoder 440 to reconstruct the signal 115. A single set of probability distribution information for a given level of quality can be reused at multiple higher levels of quality. The encoder can also specify that a given set of probability distribution information will be inherited with no need of further specifications (i.e., there will not be any overrides) from the current level of quality all the way up to the topmost (highest) level of quality. This supports yet further reduction in data that needs to be encoded, stored or transmitted.

Accordingly, embodiments herein can include receiving a range value for given reconstruction data; identifying a probability distribution for symbols in reconstruction data at a previous (e.g., lower) level of quality; and utilizing the identified probability distribution for the lower level of quality to decode the range value information into the given reconstruction data. As mentioned, reuse ("inheritance") of the probability distribution information at one or more different higher levels in the hierarchy reduces an amount of encoded data that needs to be sent to the entropy decoder to reconstruct a signal.

The entropy encoder 140 may analyze the reconstruction data 150-3 and learn that the probability distribution information for symbols in the reconstruction data 150-3 is substantially different (e.g., above a threshold value) from the distribution of symbols in reconstruction data 150-1 and/or reconstruction data 150-2. In such an instance, the entropy encoder 140 produces probability distribution information 490-3. Based on probability distribution information 490-3 and the sequence of symbols in reconstruction data 150-3, the entropy encoder 140 produces range value information 480-3.

The entropy decoder 440 is configured to receive the range value information 480-3 and probability distribution information 490-3. Entropy decoder 440 uses probability distribution information 490-3 as a basis to convert the range value information 480-3 into reconstruction data 150-3.

In accordance with an alternative embodiment, note that the entropy decoder 440 can be configured to receive the range value information for a given level of quality. In response to detecting that the entropy encoder 140 did not specify a probability distribution value for given reconstruction data, instead of using the inherited probability distribution (e.g., by way of non-limiting example, the same probability distribution information of a previous lower level of quality), the entropy decoder utilizes a default probability distribution value for one or more symbols in order to decode the range value into respective reconstruction data.

Once again, note that the choice of range encoding as an entropy encoding method is shown herein only by way of a non-limiting example, as a particular embodiment and to make the description clearer: any suitable method of entropy encoding or data compression, like the ones already cited herein or others that might be discovered or developed in the future and that make use directly or indirectly of the symbol probabilities, can be used with the same approach.

Precise Indication of Residual Distribution for Each Tile of Each Frame/LoQ

Suppose it is necessary to encode residual data for level of quality N. Assume that the decoder already has information about a previous level N−1 and has attempted to reconstruct a rendition of the signal at level N by leveraging a set of upscaling operations/filters. In order to fully reconstruct level N, the decoder now needs to receive the residual data for level N.

The encoder may have knowledge about the original level N and about the internal workings of the decoder (i.e., it can predict the "first draft" of level N that the decoder will compute), so the encoder 140 can calculate the distribution of residuals that are needed to reconstruct the whole image (e.g., all elements at the level of quality N) with a desired proximity/similarity with respect to the original image.

To increase efficiency, one embodiment herein includes just sending to the decoder the probability of the zero symbol, i.e., the symbol that occurs most often in the residual data (e.g., when the adjustment value required for an element is zero or near zero, up to a suitable threshold). This may be the most useful parameter to discriminate amongst the different possible distribution for the symbol alphabet. Accordingly, for each tile (as discussed further below) of each level of quality of each frame, the decoder 440 can be configured to have a suitable probability distribution of residuals, allowing the entropy encoding implemented by encoder 140 to compress the reconstruction data with remarkable effectiveness.

In accordance with one embodiment, as mentioned above, the specific distribution for different symbols in residual data may be sent only when it is needed at a given level of quality. For subsequent levels of quality, and possibly subsequent frames, the decoder uses by default the probability distribution information that was used for the previous level of quality, unless the encoder 140 overrides a last value by sending a new one.

Figure 6:
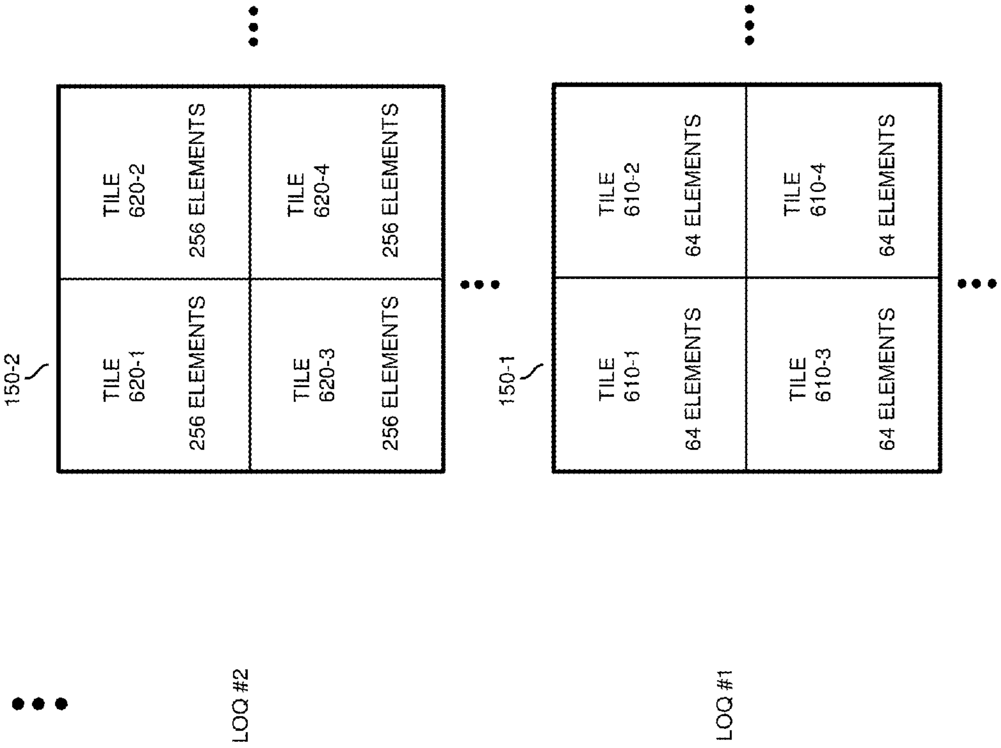
FIG. 6 is an example diagram illustrating processing of tiles of reconstruction data using one or more parallel processors according to embodiments herein.

FIG. 6 is an example diagram illustrating processing of tiles of reconstruction data using one or more parallel processors according to embodiments herein.

As shown, the entropy encoder 140 can be configured to parse each set of reconstruction data into multiple groupings of reconstruction data. For example, the entropy encoder 140 can be configured to parse reconstruction data 150-1 into tile 610-1, tile 610-2, tile 610-3, tile 610-4, and so on. Each of tiles 610 at level of quality #1 can include reconstruction data relative to a predetermined number (e.g., 64) of contiguous elements in the signal.

The entropy encoder 140 can be configured to parse reconstruction data 150-2 into tile 620-1, tile 620-2, tile 620-3, tile 620-4, and so on. Each of tiles 620 can include reconstruction data relative to a predetermined number (e.g., 256) of contiguous elements in the signal.

Note that reconstruction data is not block-based, or tile-based, in that it may be obtained by processing the whole signal, and only after being produced it is sliced into separate tiles, in order to allow for parallel entropy encoding/decoding.

Figure 7:
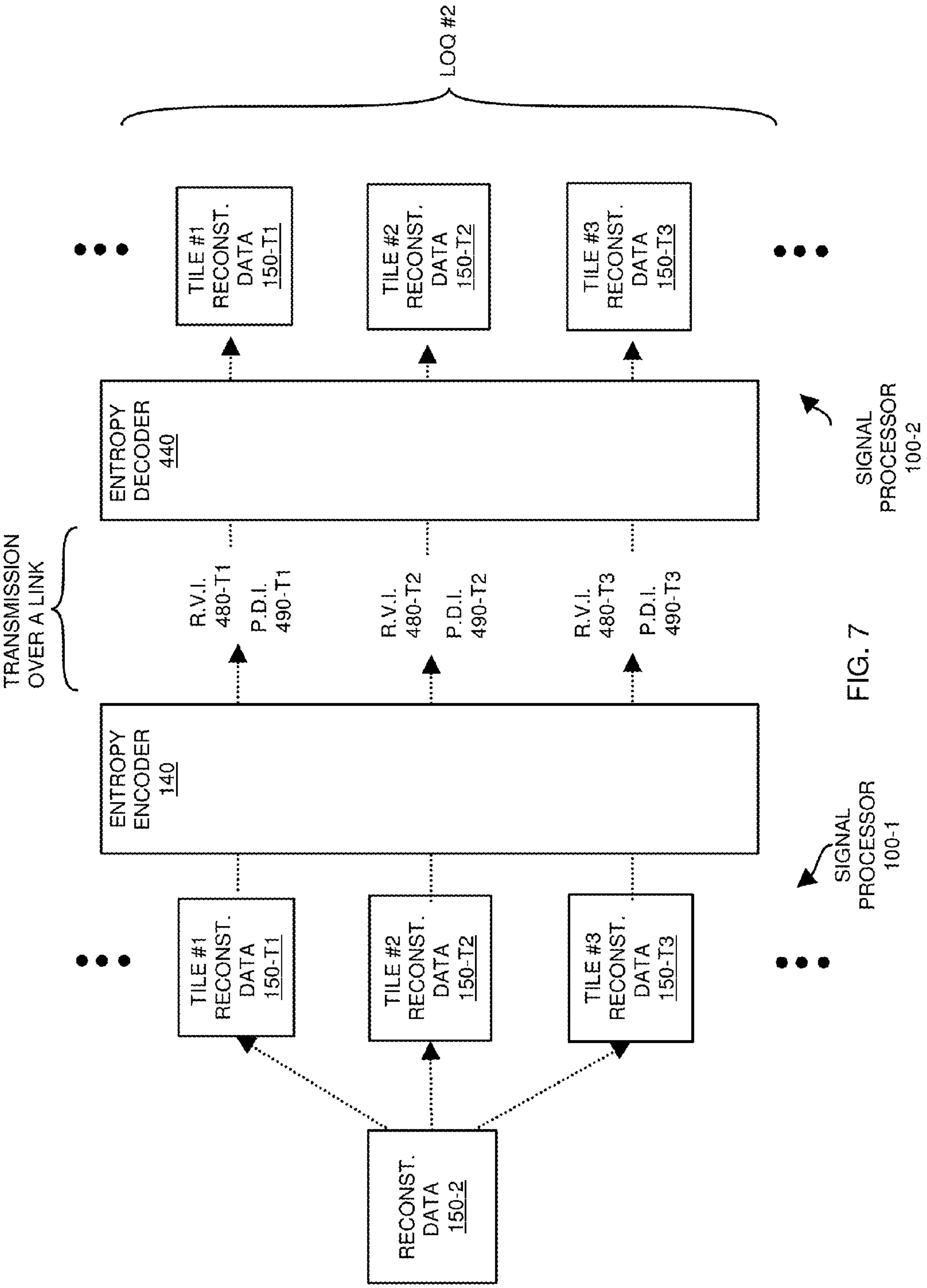
FIG. 7 is an example diagram illustrating processing of multiple tiles at a given level of quality according to embodiments herein.

FIG. 7 is an example diagram illustrating encoding of multiple tiles of a given set of reconstruction data (e.g., residual data, or adjustments to the motion map for motion compensation, etc.) at a given level of quality according to embodiments herein.

As previously discussed, the entropy encoder 140 can be configured to parse the reconstruction data for a given level of quality into multiple tiles. In this example, the reconstruction data 150-2 is parsed into tile reconstruction data 150-T1, tile reconstruction data 150-T2, tile reconstruction data 150-T3, and so on.

In accordance with such an embodiment, the entropy encoder 140 produces probability distribution information (e.g., a respective probability distribution value) for one or more symbols in each of the multiple groupings. For example, the entropy encoder 140 encodes each of the multiple groupings of tiled reconstruction data into range values based on the respective probability distribution values for the tile groupings.

More specifically, entropy encoder 140 produces probability distribution information 490-T1 indicating a distribution of one or more symbols in tile reconstruction data 150-T1; entropy encoder 140 produces probability distribution information 490-T2 indicating a distribution of one or more symbols in tile reconstruction data 150-T2; entropy encoder 140 produces probability distribution information 490-T3 indicating a distribution of one or more symbols in tile reconstruction data 150-T3; and so on.

Based on the probability distribution information 490-T1 and a sequence of symbols in reconstruction data 150-T1, the entropy encoder 140 produces range value information 480-T1; based on the probability distribution information 490-T2 and a sequence of symbols in reconstruction data 150-T2, the entropy encoder 140 produces range value information 480-T2; based on the probability distribution information 490-T3 and a sequence of symbols in reconstruction data 150-T3, the entropy encoder 140 produces range value information 480-T3; and so on.

In one example embodiment, each of the multiple groupings of reconstruction data contains residual data relative to signal elements included in a tile. Each of the residual data elements indicates an adjustment to be made to a corresponding portion of the signal during conversion of the signal from the first level of quality to the second level of quality.

Reducing the reconstruction data into different sets of tiles as discussed herein enables the signal processor 100-2 to initiate parallel execution of multiple entropy decoders to reproduce the multiple groupings of reconstruction data (e.g., tile reconstruction data 150-T1, tile reconstruction data 150-T2, tile reconstruction data 150-T3, . . . ) using the range values 480-T and the probability distribution values 490-T.

Calculating the distribution/histogram of residuals for the global signal/image can also be done via a parallel algorithm, by simply merging the distributions/histograms calculated on tiles.

Figure 8:
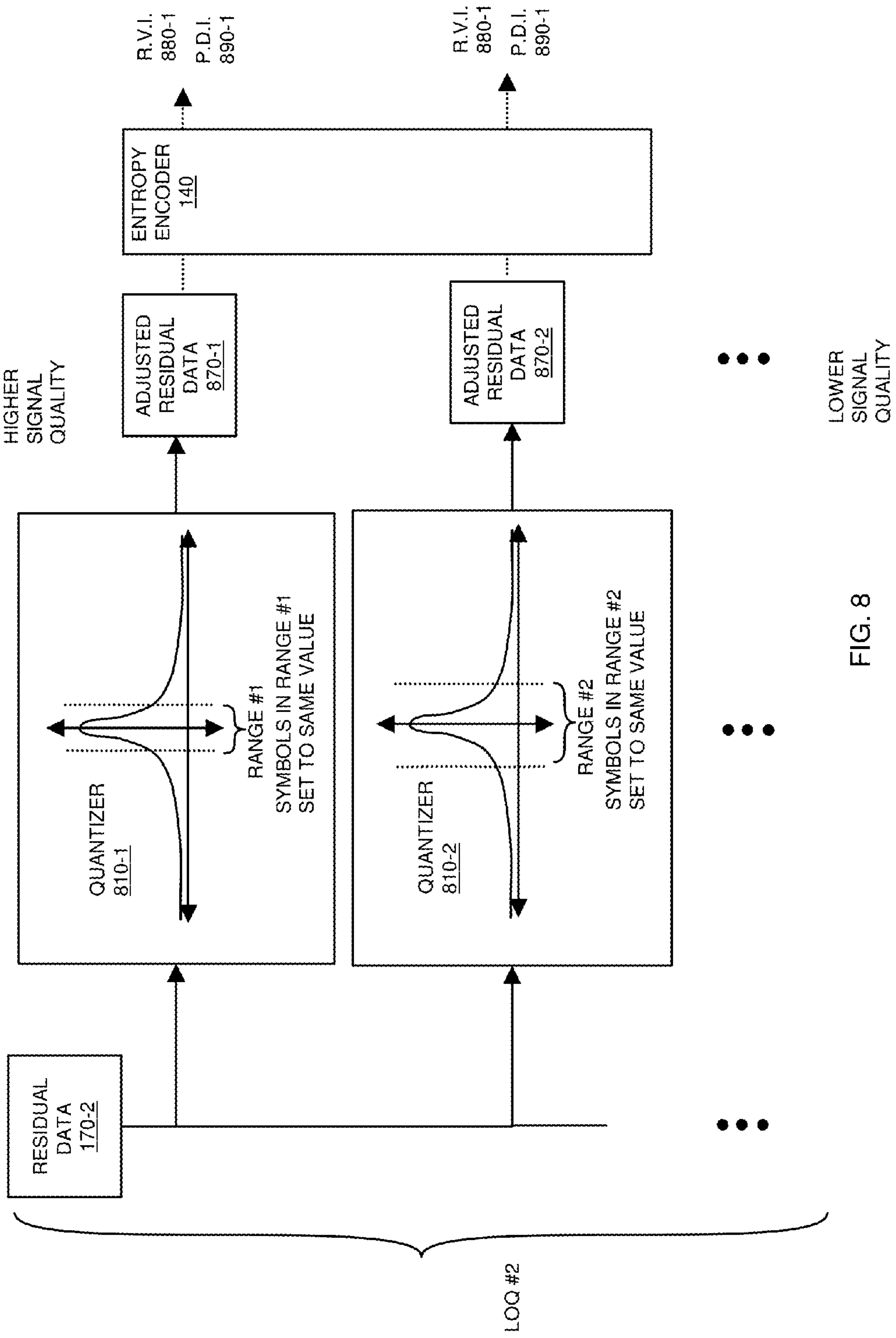
FIG. 8 is an example diagram illustrating quantizing of reconstruction data at a given level of quality using multiple quantizers according to embodiments herein.

FIG. 8 is an example diagram illustrating quantization of reconstruction data at a given level of quality using one or more dead-zone quantizers according to embodiments herein. Adjusting and applying different dead zones to the reconstruction data (e.g., residual data) enables each of multiple levels of quality of reconstruction data to be further encoded according to multiple different sub-levels of quality.

For example, the encoder generates reconstruction data such as residual data 170-2. Note that any type of reconstruction data at any level of quality in the hierarchy can be encoded into different sub-levels of quality using dead-zone quantizing as described herein.

Via application of the different dead zone settings (e.g., with quantizer 810-1, quantizer 810-2, . . . ), the encoder parses the residual data 170-2 (i.e., reconstruction data) into multiple groupings including adjusted residual data 870-1, adjusted residual data 870-2, and so on. For example, in one embodiment, the encoder applies quantizer 810-1 to the residual data 170-2 to produce adjusted residual data 870-1; the encoder applies quantizer 810-2 to the residual data 170-2 to produce adjusted residual data 870-2; and so on. Quantizer 810-1 has the effect of setting any symbols in range #1 to a common symbol such as zero (thus the common name "dead zone" for the range); quantizer 810-2 has the effect of setting any symbols in range #2 to a common symbol such as zero; and so on. Each quantizer provides a different level of dead-zoning (and potentially even different quantization steps), resulting in different sub-levels of quality.

The entropy encoder 140 individually encodes each of the different groupings of reconstruction data at the different sub-levels of quality.

For example, for the first grouping of adjusted residual data 870-1, the entropy encoder 140 analyzes the adjusted residual data 870-1 to produce a first probability distribution value (e.g., probability distribution information 890-1) for one or more symbols in the adjusted residual data 870-1. The entropy encoder 140 produces range value information 880-1 based on the probability distribution information 890-1 and the element settings of adjusted residual data 870-1 in a manner as previously discussed for other reconstruction data.

For the second grouping of adjusted residual data 870-2, the entropy encoder 140 analyzes the adjusted residual data 870-2 to produce a probability distribution value (e.g., probability distribution information 890-2) for one or more symbols in the adjusted residual data 870-2. The entropy encoder 140 produces range value information 880-2 based on the probability distribution information 890-2 and the element settings of adjusted residual data 870-2.

Encoding of each of one or more levels of quality in the hierarchy using different quantizers as discussed above is useful during network congestion such as conditions preventing transmission of reconstruction data to a decoder. For example, in response to detection and/or occurrence of an impediment preventing timely transmission or decoding of the range value information 880-1 and the probability distribution information 890-1 (e.g., the range value information 880-1 and the probability distribution information 890-1 include a larger amount of data compared to range value information 880-2 and probability distribution information 890-2), embodiments herein include transmitting range value information 880-2 and probability distribution information 890-2 to the decoder. The decoder 440 decodes the range value information 880-2 and probability distribution information 890-2 to produce the adjusted residual data 870-2.

In accordance with further embodiments, quantization at each of one or more levels of quality can be adjusted depending on a parameter such as an available bandwidth to transmit the range value information and probability distribution information. That is, the larger amounts of data (e.g., a higher sub-level of quality of reconstruction data) can be transmitted during times when higher bandwidth is available; the smaller amounts of data (e.g., a lower sub-level of quality of reconstruction data) can be transmitted during times when bandwidth is limited.

Thus, one embodiment herein includes generating adjusted residual data to reconstruct the signal at a given level of quality in the hierarchy. The entropy encoder 140 applies different quantization to the residual data 170-2 to reduce an entropy of the adjusted residual data at the given level of quality prior to the entropy encoding. Application of the quantizer or quantizers to the residual data 170-1 facilitates transmission of the encoded residual data in accordance with a desired bit rate (e.g., Constant Bit Rate, CBR) because enlarging the dead zone (e.g., from range #1 to range #2) for a given alphabet of symbols reduces an entropy of the adjusted residual data. That is, the lower sub-level of quality range value information 880-2 and probability distribution information 890-2 require fewer bits and require less time to transmit than range value information 880-1 and probability distribution information 890-1.

In accordance with yet further embodiments, the signal processor 100-1 and/or entropy encoder 140 can be configured to calculate a probability distribution of symbols in residual data used to make adjustments to the signal at multiple levels of quality in the hierarchy. For example, in one embodiment, the signal processor 100-1 utilizes the calculated probability distribution for reconstruction data to estimate a bit rate of entropy encoding the residual data at one or more levels of quality based on a first quantization setting. In response to detecting that the estimated bit rate for transmitting reconstruction data such as residual data is above a desired threshold value, the signal processor 100-1 can apply additional/different quantization to the residual data (e.g., by enlarging the dead zone that gets quantized into the most probable symbol) to reduce an entropy associated with the residual data and to reduce an amount of data (e.g., range value information and probability distribution information at each level of quality) that must be transmitted to the decoder to reconstruct the signal 115. Accordingly, the signal processor 100-1 can adjust an entropy of the residual data at each of multiple levels of quality to ensure that the encoded data can be transmitted to a destination within the limits imposed by a desired bit rate.

Figure 9:
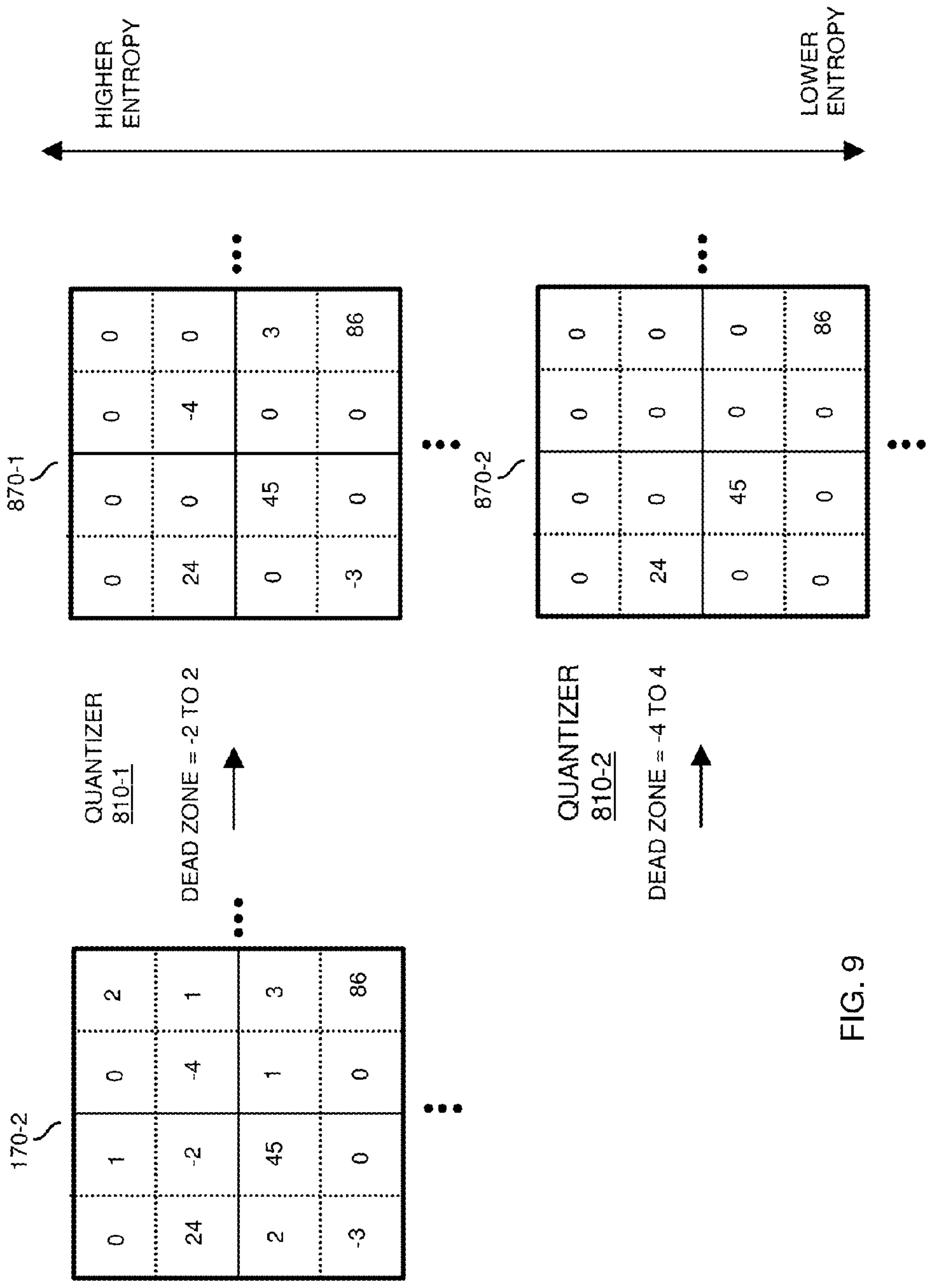
FIG. 9 is an example diagram illustrating quantizing of reconstruction data using different quantizer settings according to embodiments herein.

FIG. 9 is an example diagram illustrating quantization of reconstruction data using different dead zone settings according to embodiments herein.

As shown, application of the quantizer 810-1 converts any symbols in residual data 170-2 falling in range #1 between −2 and 2 into a symbol value of zero when producing adjusted residual data 870-1. In other words, the quantizer 810-1 sets the elements in residual data 170-2 having values 1, 2, −2, 1, 2, and 1 to a common symbol value of 0 to produce adjusted residual data 870-1. In this particular example, other values in reconstruction data 170-2 carry over from the residual data 170-2 to the adjusted residual data 870-1; this is just intended to make the example easier to follow, and it should be understood that in practical embodiments of the invention the other values might be quantized as well, with a quantization step equal to or different from the width of the dead zone #1.

As shown, application of the quantizer 810-2 converts any symbols in residual data 170-2 falling in range #2 between −4 and 4 into a symbol value of zero when producing adjusted residual data 870-2. In other words, the quantizer 810-2 sets the elements in residual data 170-2 having values 1, 2, −2, −4, 1, 2, 1, 3, and −3 to a common symbol value of 0 to produce adjusted residual data 870-2. In this particular example, other values in reconstruction data 170-2 carry over from the residual data 170-2 to the adjusted residual data 870-2; again, this is just intended to make the example easier to follow, and it should be understood that in practical embodiments of the invention the other values might be quantized as well, with a quantization step equal to or different from the width of the dead zone #2.

The encoder can be configured to repeat this process for each of multiple sub-levels of quality.

As a result of applying different dead-zone quantizers, the adjusted residual data 870-1 has a higher entropy than adjusted residual data 870-2. Accordingly, the encoded set of data for the adjusted residual data 870-2 is smaller than the encoded set of data for adjusted residual data 870-1. As mentioned above, during network congestion, it may be advantageous to transmit and decode adjusted residual data 870-2 in lieu of transmitting and decoding adjusted residual data 870-1.

Figure 10:
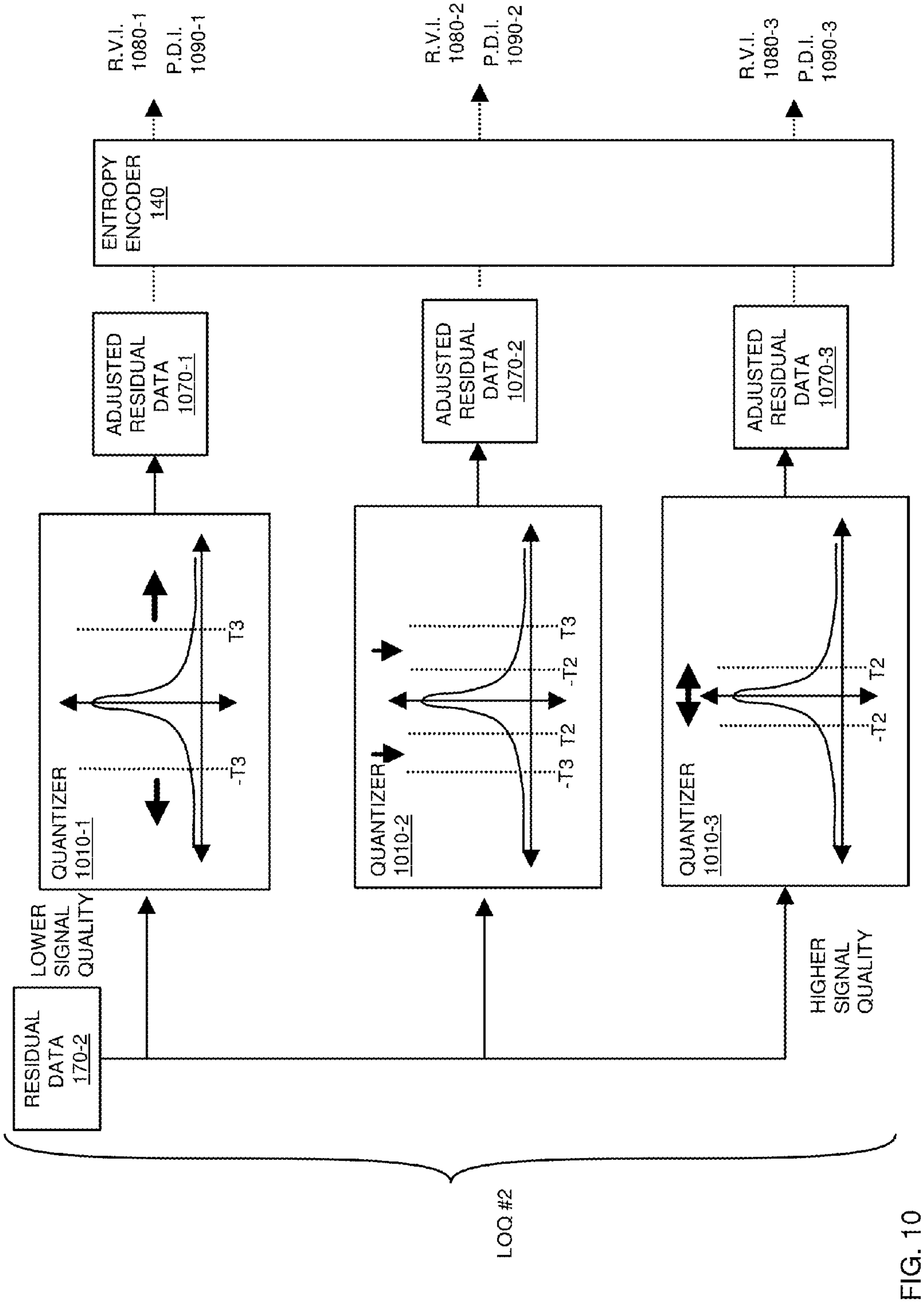
FIG. 10 is an example diagram illustrating parsing a set of reconstruction data representing residual data into different groupings of residual data according to embodiments herein.

FIG. 10 is an example diagram illustrating parsing the reconstruction data into different groupings of residual data according to magnitude according to embodiments herein.

In this example embodiment, the encoder parses the reconstruction data such as residual data 170-2 into multiple groupings (e.g., adjusted residual data 1070-1, adjusted residual data 1070-2, adjusted residual data 1070-3, etc.). Via quantizer 1010-1, the signal processor 100-1 produces adjusted residual data 1070-1. In one embodiment, the signal processor 100-1 populates the adjusted residual data 1070-1 (e.g., first group of reconstruction data) to include elements of the residual data 170-2 having a value that falls outside of a first range, such as values less than −T3 and values greater than +T3. Other values (i.e., in the "dead zone" between −T3 and +T3) are set to a common symbol such as zero, which will become increasingly probable and as such will require fewer bits to be represented with entropy encoding.

Via quantizer 1010-2, the signal processor 100-1 produces adjusted residual data 1070-2. In one embodiment, the signal processor 100-1 populates the adjusted residual data 1070-2 (e.g., a second group of reconstruction data) to include elements of the residual data 170-2 having a value that falls outside of the first range and within a second range (e.g., values falling between −T3 and −T2, and between +T2 and +T3). Value falling in the dead zone between −T2 and +T2 are set to a common symbol such as zero; other values (i.e., less than −T3 and greater than +T3) are not encoded.

Via quantizer 1010-3, the signal processor 100-1 further produces adjusted residual data 1070-3. In one embodiment, the signal processor 100-1 populates the adjusted residual data 1070-3 (e.g., a third group of reconstruction data) to include elements of the residual data 170-2 having a value that falls within a third range (e.g., values falling between −T2 and T2). Other values are not encoded.

The entropy encoder 140 individually encodes the adjusted residual data 1070.

For example, the entropy encoder 140 analyzes adjusted residual data 1070-1 to produce probability distribution information 1090-1. Based on probability distribution information 1090-1 and the sequence of elements in adjusted residual data 1070-1, the entropy encoder 140 produces range value information 1080-1.

Thus, the entropy encoder 140 can be configured to individually encode the different groupings of adjusted residual data 1070 into corresponding range value information and probability distribution information. For example, the entropy encoder 140 encodes the adjusted residual data 1070-1 into probability distribution information 1090-1 and range value information 1080-1; the entropy encoder 140 encodes the adjusted residual data 1070-2 into probability distribution information 1090-2 and range value information 1080-2; the entropy encoder 140 encodes the adjusted residual data 1070-3 into probability distribution information 1090-3 and range value information 1080-3; and so on.

Parsing and encoding the reconstruction data in complementary groupings as discussed above can be useful in cases such as variable/non-predictable computing power of decoders or provision of different quality to different decoders (e.g., pay-per-view services), or during congestion of the transmission channel between encoder and decoder. For example, in one embodiment, in response to occurrence of an impediment preventing timely decoding of all groupings of reconstruction data (e.g., adjusted residual data 1070-1, adjusted residual data 1070-2, adjusted residual data 1070-3, and so on) to produce a higher accuracy replica of an original signal, the signal processor 100-2 can initiate decoding of a subset of the encoded residual data such as only range value information 1080-1 into adjusted residual data 1070-1 based on probability distribution information 1090-1. In this instance, the signal processor 100-2 utilizes the decoded first grouping of reconstruction data to convert the rendition of the signal at the first level of quality to the second level of quality.

Figure 11:
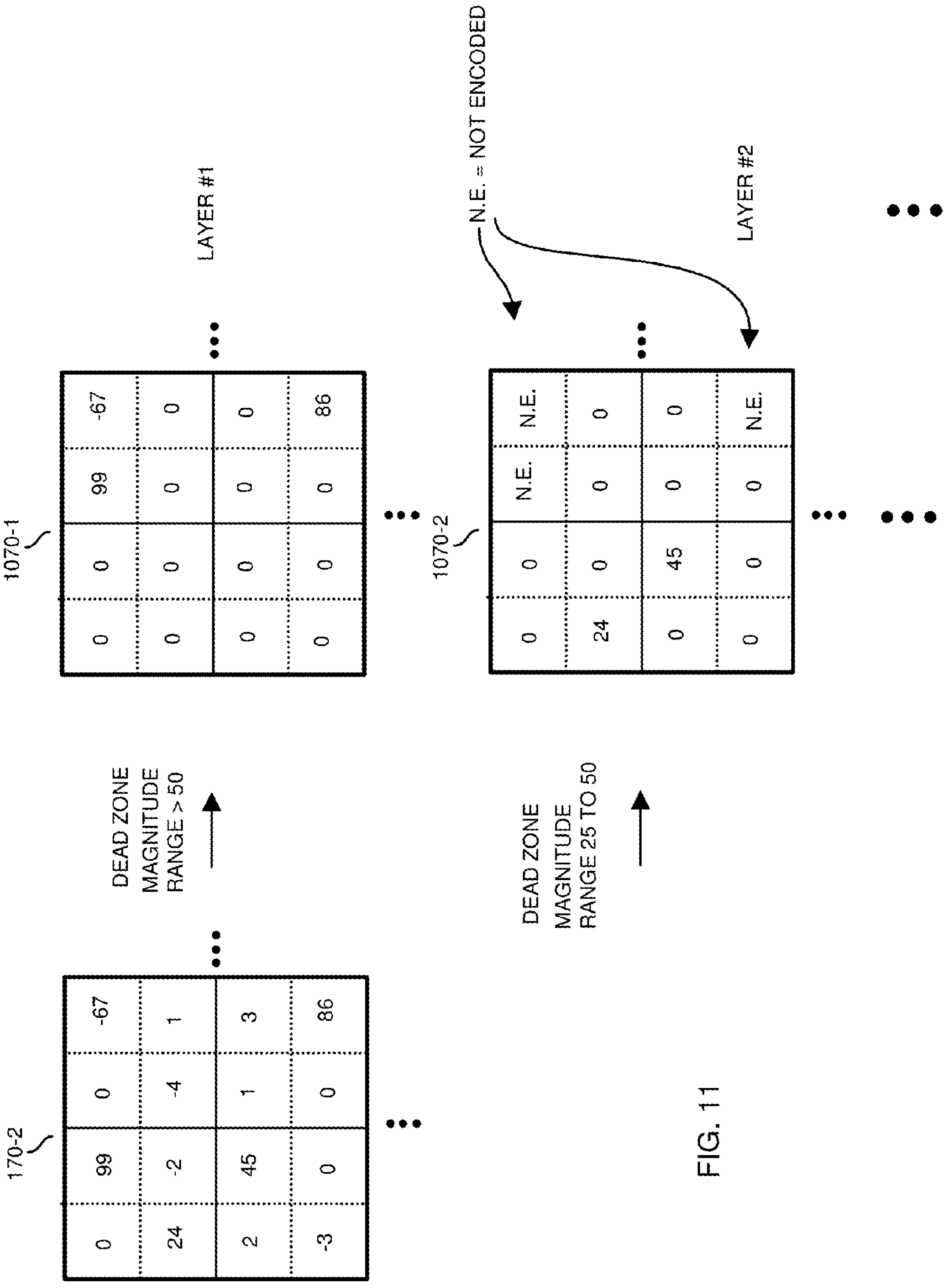
FIG. 11 is an example diagram illustrating creation of different reconstruction data groupings according to embodiments herein.

FIG. 11 is an example diagram illustrating quantization of reconstruction data using different quantizer settings according to embodiments herein. As shown, the encoder 140 parses the adjusted residual data 170-2 into adjusted residual data 1070-1, adjusted residual data 1070-2, etc.

The encoder 140 populates the adjusted residual data 1070-1 to include elements of the residual data 170-2 having values that fall outside of a first range, e.g., greater than 50 in magnitude. All other values are set to zero.

The encoder 140 populates the adjusted residual data 1070-2 to include elements of the generated reconstruction data having values that fall within a magnitude range between 25 and 50. Values already encoded with a non-zero symbol in the adjusted residual data 1070-1 no longer need to be encoded in the adjusted residual data 1070-2. All other values are set to zero.

The signal processor 100-1 repeats this process for each range.

As discussed above, the entropy encoder 140 individually encodes the sets of adjusted residual data 1070.

Example of Precise Control of Bit Rate or Constant Bit Rate Encoding

MPEG-family codecs and other industry standard codecs cannot encode according to a constant bit rate in which an encoded bitstream stays within a predefined range of bits per second. This is largely due to the nature of the algorithms. That is, such codecs can determine the precise number of bits needed for encoding an image only after having completed the full encoding process. When the bit quota is not met, such encoders must re-encode the original signal multiple times with different parameters, until the generated size is within a desired threshold from the target. In general, in situations of constant bit rate, the encoder frequently starts encoding with high-compression parameters since the beginning (thus often achieving a lower quality than what would be theoretically possible with the available bit rate) in order to minimize the risk of having to re-encode the signal multiple times.

In contrast to conventional codecs, and according to embodiments herein, it is possible to know in advance how many bits will be needed to encode reconstruction data because the number of bits only depends on the probability distribution of the reconstruction data, which can be calculated before starting the entropy encoding process. Suitable proxies of the probability distribution can also be used, such as the probability of the zero symbol in the residual data.

Since embodiments herein operate on the whole signal (not on small blocks, e.g. 8×8 pixel blocks, as in MPEG-family codecs or other frequency-domain codecs), it is possible to easily calculate how many bits will be needed to encode respective different reconstruction data. If it is not possible to transmit or decode a higher resolution reconstruction data, the reconstruction data can be adaptively quantized as discussed herein to reduce the entropy of residuals (and thus the necessary bit rate).

One embodiment herein includes setting values that fall within a range to around zero to increase a probability of the zero symbol, or increasing the quantization steps to reduce the alphabet of symbols. Reducing the entropy in these manners enables the encoded signal to be transmitted to the decoder in fewer bits. Integrity of the reconstructed signal may suffer somewhat due to the quantization of residual data (which is used to produce detailed aspects of the signal 115 on playback). However, there will be no pauses on playback caused by congestion. When more bandwidth is available, the higher quality reconstruction data can be transmitted to the decoder for reconstruction and playback of a signal.

Figure 12:
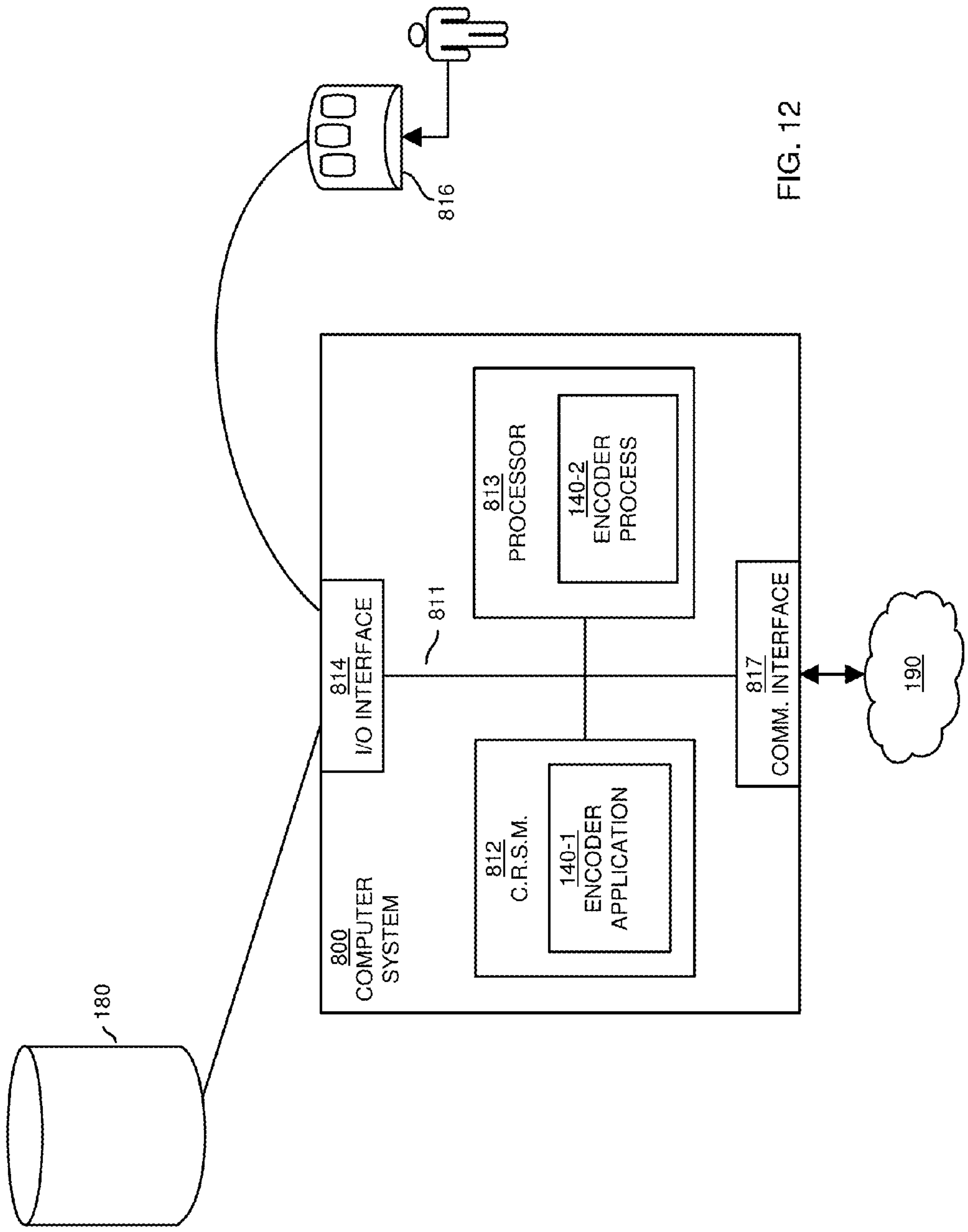
FIG. 12 is a diagram illustrating an example computer architecture for executing computer code, firmware, software, applications, logic, etc., according to embodiments herein.

FIG. 12 is an example block diagram of a computer system 800 that provides computer processing according to embodiments herein.

Computer system 800 can be or include a computerized device such as a personal computer, processing circuitry, television, playback device, encoding device, workstation, portable computing device, console, network terminal, processing device, network device, operating as a switch, router, server, client, etc.

Note that the following discussion provides a basic embodiment indicating how to carry out functionality associated with signal processor 140 as previously discussed. However, it should be noted that the actual configuration for carrying out the operations as described herein can vary depending on a respective application. Other resources such as decoder 440 can be implemented via a respective computer system including one or more processors and storage hardware to carry out decoding as discussed herein.

As shown, computer system 800 of the present example includes an interconnect 811 that couples computer readable storage media 812 such as a non-transitory type of media, computer readable, hardware storage medium, etc., in which digital information can be stored and retrieved. Computer system 800 can further include one or more processors 813, I/O interface 814, and a communications interface 817.

I/O interface 814 provides connectivity to repository 180, and if present, display screen, peripheral devices 816 such as a keyboard, a computer mouse, etc.

Computer readable storage medium 812 (e.g., a hardware storage media) can be any suitable device and/or hardware such as memory, optical storage, hard drive, floppy disk, etc. The computer readable storage medium can be a non-transitory storage media to store instructions associated with signal processor 140. The instructions are executed by a respective resource such as signal processor 140 to perform any of the operations as discussed herein.

Communications interface 817 enables computer system 800 to communicate over network 190 to retrieve information from remote sources and communicate with other computers, switches, clients, servers, etc. I/O interface 814 also enables processor 813 to retrieve or attempt retrieval of stored information from repository 180.

As shown, computer readable storage media 812 can be encoded with signal processor application 140-1 executed by processor(s) 813 as signal processor process 140-2.

Note that the computer system 800 or encoder 140 also can be embodied to include a computer readable storage medium 812 (e.g., a hardware storage media, non-transitory storage media, etc.) for storing data and/or logic instructions.

Computer system 800 can include one or more processors 813 to execute such instructions and carry out operations as discussed herein. Accordingly, when executed, the code associated with signal processor application 140-1 can support processing functionality as discussed herein. As mentioned, signal processor 140 can be configured to support encoding and/or decoding.

During operation of one embodiment, processor(s) 813 accesses computer readable storage media 812 via the use of interconnect 811 in order to launch, run, execute, interpret or otherwise perform the instructions of signal processor application 140-1 stored in computer readable storage medium 812. Execution of the signal processor application 140-1 produces processing functionality in processor(s) 813. In other words, the encoder process 140-2 associated with processor (s) 813 represents one or more aspects of executing signal processor application 140-1 within or upon the processor(s) 813 in the computer system 800.

Those skilled in the art will understand that the computer system 800 can include other processes and/or software and hardware components, such as an operating system that controls allocation and use of hardware processing resources to execute signal processor application 140-1.

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Figure 13:
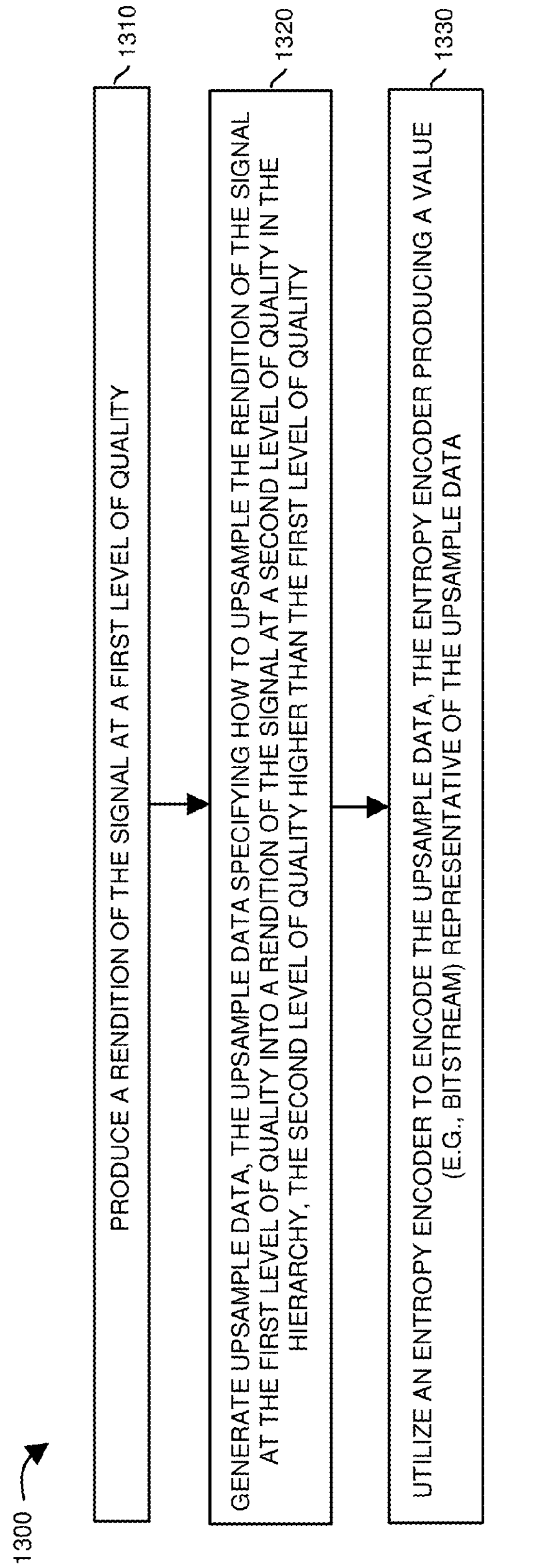
FIG. 13 is an example flowchart illustrating a method of processing reconstruction data according to embodiments herein.

FIG. 13 is an example flowchart 1300 illustrating a method of generating and utilizing entropy encoding according to embodiments herein.

In step 1310, the signal processor 100-1 produces a rendition of the signal at a first level of quality.

In step 1320, the signal processor 100-1 generates reconstruction data, the reconstruction data specifies how to convert the rendition of the signal at the first level of quality into a rendition of the signal at a second level of quality in a hierarchy, the second level of quality being higher than the first level of quality.

In step 1330, the signal processor 100-1 utilizes an entropy encoder to encode the reconstruction data. The entropy encoder 140 produces a bitstream (e.g., range value information) representative of the reconstruction data.

Note again that techniques herein are well suited for use in processing and reconstructing signals. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method of encoding a signal in a hierarchy including multiple levels of quality, the multiple levels of quality including a first level of quality and a second level of quality, the method comprising:

processing a rendition of the signal at the second level of quality, the second level of quality higher than the first level of quality;

producing a rendition of the signal at the first level of quality;

generating reconstruction data, the reconstruction data specifying how to reconstruct, based on the rendition of the signal at the first level of quality, the rendition of the signal at the second level of quality in the hierarchy; and utilizing an entropy encoder to encode the reconstruction data, the entropy encoder producing an encoded value representative of symbols in the reconstruction data;

wherein utilizing the entropy encoder further includes:

analyzing the reconstruction data to produce decoding information, the decoding information including probability distribution information indicating a probability of the symbols in the reconstruction data; and storing the encoded value and the probability distribution information for subsequent decoding of the encoded value back into the reconstruction data.

2. The method as in claim 1, wherein the reconstruction data includes multiple different sets of reconstruction data, each of the multiple different sets of reconstruction data individually encoded with respect to each other and specifying how to reconstruct a rendition of the signal at the second level of quality based on a rendition of the signal at the first level of quality, each of the multiple different sets of reconstruction data supporting different corresponding sub-levels of quality.

3. The method as in claim 1, wherein the reconstruction data includes multiple sets of reconstruction data:

wherein one of the sets of reconstruction data includes residual data indicating adjustments to be made after upsampling the rendition of signal at the first level of quality to the second level of quality; and wherein utilizing the entropy encoder includes producing a decoding parameter to be used by a respective entropy decoder to extrapolate a probability distribution for multiple symbols in the residual data.

4. The method as in claim 1, wherein the decoding information includes a first parameter and additional parameters, the first parameter specifying a percentage of elements in the reconstruction data that are assigned a first symbol, the additional parameters indicating probabilities of multiple additional symbols in the reconstruction data.

5. The method as in claim 1, wherein the decoding information includes a first parameter and a second parameter, the first parameter specifying a percentage of elements in the reconstruction data that are assigned a first symbol, the second parameter indicating to the decoder how to extrapolate probability distribution values for multiple symbols other than the first symbol in the reconstruction data.

6. The method as in claim 1, wherein the decoding information includes only a single parameter indicating a probability for a first symbol in the reconstruction data, the entropy decoder extrapolating a probability distribution for multiple symbols other than the first symbol based on a predetermined set of standard parameters known to an entropy decoder that converts the encoded value back into the reconstruction data.

7. The method as in claim 1 further comprising:

parsing the reconstruction data into multiple groupings of reconstruction data;

utilizing the entropy encoder to produce respective probability distribution information for symbols present in each of the multiple groupings; and utilizing the entropy encoder to encode the multiple groupings of reconstruction data into encoded values based on respective probability distribution information for the groupings.

8. The method as in claim 7, wherein each of the multiple groupings of reconstruction data correspond to a tile of residual data elements relative to a specific portion of the signal, each of the residual data elements indicating an adjustment to be made to a corresponding element of the signal after upsampling of the signal from the first level of quality to the second level of quality, the method further comprising:

initiating parallel execution of multiple entropy decoders to decode the multiple groupings of reconstruction data using, for each grouping, specific encoded values and probability distribution values.

9. The method as in claim 1, wherein the reconstruction data includes a first array of sets of reconstruction data, the method further comprising:

generating a second array of sets of reconstruction data, the second array of sets of reconstruction data specifying how to reconstruct, based on the rendition of the signal at the second level of quality, a rendition of the signal at a third level of quality in the hierarchy, the third level of quality higher in the hierarchy than the second level of quality; and analyzing each set of reconstruction data of the second array to produce decoding parameters based on probability distribution information, the probability distribution information indicating a probability of a symbol used by that set of reconstruction data; and utilizing the entropy encoder to encode the second array of sets of reconstruction data, the entropy encoder producing for each respective set of reconstruction data in the second array an encoded value representative of data based on probability distribution information produced for the respective set.

10. The method as in claim 1, wherein the reconstruction data includes a first array of sets of reconstruction data, the method further comprising:

generating a second array of sets of reconstruction data, the second array of sets of reconstruction data specifying how to reconstruct, based on the rendition of the signal at the second level of quality, a rendition of the signal at a third level of quality in the hierarchy, the third level of quality being higher than the second level of quality; and utilizing the entropy encoder to encode the second array of sets of reconstruction data, the entropy encoder producing for each set of reconstruction data in the second array an encoded value representative of data based on probability distribution information of a corresponding set of data in the second array.

11. The method as in claim 1 further comprising:

parsing the reconstruction data into multiple groupings including at least a first grouping of reconstruction data and a second grouping of reconstruction data;

populating the first grouping of reconstruction data so that elements associated with the first grouping of reconstruction data having a value that falls within a first range are set to a default value;

populating the second grouping of reconstruction data so that elements associated with the second grouping having a value that falls within a second range are set to a default value; and wherein utilizing the entropy encoder further comprises individually entropy encoding the first grouping of reconstruction data and the second grouping of reconstruction data.

12. The method as in claim 11, wherein individually entropy encoding further comprises:

for the first grouping:

analyzing the first grouping of reconstruction data to produce decoding parameters with first probability distribution information, the first probability distribution information indicating a probability distribution of symbols used by the first grouping; and utilizing the entropy encoder to produce a first encoded value based on first probability distribution information, the first encoded value representative of the first grouping of reconstruction data;

for the second grouping:

analyzing the second grouping of reconstruction data to produce decoding parameters with second probability distribution information, the second probability distribution information indicating a probability distribution of symbols in the the second grouping; and utilizing the entropy encoder to produce a second encoded value based on the second probability distribution information, the second encoded value representative of the second grouping of reconstruction data.

13. The method as in claim 12 further comprising:

for specific sets of reconstruction data, in response to occurrence of an impediment preventing timely entropy decoding of all of the groupings of reconstruction data, initiating entropy decoding of only some encoded values into respective groupings of reconstruction data, said entropy decoding of each grouping of reconstruction data based on respective decoding parameters indicating probability distribution information; and utilizing, along with other sets of reconstruction data already decoded, entropy decoded groupings of reconstruction data to reconstruct, based on the rendition of the signal at the first level of quality, the rendition of the signal at the second level of quality.

14. The method as in claim 12 further comprising:

for specific sets of reconstruction data, in response to occurrence of an impediment preventing timely entropy encoding, initiating transmission to the decoder of only some of the encoded values corresponding to the respective groupings of reconstruction data, along with any decoding parameters indicating probability distribution information.

15. The method as in claim 1 further comprising:

generating residual data to reconstruct the signal at a given level of quality in the hierarchy; and estimating, based on an entropy metric, a number of bits required to entropy encode the residual data; and applying a quantizer to the residual data to reduce an entropy of the residual data at the given level of quality prior to entropy encoding, application of the quantizer to the residual data facilitating transmission of the encoded residual data in accordance with a desired bit rate.

16. The method as in claim 1 further comprising:

calculating a probability distribution of symbols in residual data used to make adjustments to the signal at multiple levels of quality in the hierarchy;

utilizing the probability distribution to estimate a bit rate of entropy encoding the residual data based on a first quantizer setting;

in response to detecting that the estimated bit rate is above a desired threshold value, applying additional quantization to the residual data to reduce an entropy associated with the residual data; and utilizing the entropy encoder to encode the quantized residual data.

17. The method as in claim 1, wherein the entropy encoder is a range encoder.

18. The method as in claim 1, wherein producing the rendition of the signal at the first level of quality includes:

downsampling the rendition of the signal at the second level of quality to produce the rendition of the signal at the first level of quality, the rendition of the signal at the first level of quality being a downsampled rendition of the signal at the second level of quality.

19. The method as in claim 1, wherein the signal specifies settings of display elements in an image, the rendition of the signal at the second level of quality including a larger field of display elements than the rendition of the signal at the first level of quality.

20. The method as in claim 1, wherein the signal specifies settings of display elements in a volumetric image, the rendition of the signal at the second level of quality including a larger field of display elements than the rendition of the signal at the first level of quality.

21. The method as in claim 1, wherein generating the reconstruction data includes:

producing the reconstruction data to indicate how to upsample the rendition of the signal at the first level of quality to the rendition of the signal at the second level of quality.

22. A method of decoding at multiple levels of quality in a hierarchy, the multiple method of decoding at multiple levels of quality in a hierarchy, the multiple levels of quality including a first level of quality and a second level of quality, the method comprising:

producing a rendition of a signal at the first level of quality;

receiving encoded reconstruction data indicating how to reconstruct the rendition of the signal at the first level of quality into a rendition of the signal at the second level of quality, the second level of quality higher than the first level of quality in the hierarchy;

utilizing an entropy decoder to retrieve probability distribution information and a value stored in the encoded reconstruction data;

via the decoder, utilizing the probability distribution information to decode the value into decoded reconstruction data; and utilizing the decoded reconstruction data produced by the decoder to reconstruct, based on the rendition of the signal at the first level of quality, the rendition of the signal at the second level of quality.

23. The method as in claim 22, wherein the encoded reconstruction data includes a first array of sets of reconstruction data, the method further comprising:

receiving encoded values for a second array of sets of reconstruction data, the second array of sets of reconstruction data indicating how to reconstruct, based on the rendition of the signal at the second level of quality, a rendition of the signal at a third level of quality in the hierarchy, the third level of quality being higher than the second level of quality;

receiving decoding parameters and identifying probability distributions for symbols in each set of reconstruction data of the second array; and utilizing the identified probability distributions to decode the encoded values for the second array of sets of reconstruction data.

24. The method as in claim 23 further comprising:

for each set of reconstruction data in the second array, in response to detecting that the entropy encoder did not provide probability distribution information, utilizing the probability distribution information decoded for a corresponding set in the first array of reconstruction data to entropy decode encoded values in the second array of sets of reconstruction data.

25. The method as in claim 22, wherein the encoded reconstruction data includes multiple sets of encoded reconstruction data, the method further comprising:

receiving a respective encoded value for each set of encoded reconstruction data; and in response to detecting that the entropy encoder did not provide specific information on probability distribution of symbols to decode a respective encoded value in a set of encoded reconstruction data, utilizing a default probability distribution value to decode the respective encoded value.

26. The method as in claim 22, wherein the received encoded reconstruction data includes multiple groupings of reconstruction data, each of the groupings corresponding to a respective tile of residual data elements relative to a specific portion of the signal, each of the residual data elements in the respective tile indicating an adjustment to be made to a corresponding element of the signal after upsampling the specific portion of the signal from the first level of quality to the second level of quality, the method further comprising:

initiating parallel execution of multiple entropy decoders to independently decode the multiple groupings of reconstruction data.

27. The method as in claim 26, wherein the specific portion of the signal to which the respective tile of residual data pertains is less than all of the signal, the decoder producing the rendition of the signal at the second level of quality for the specific portion of the signal.

28. The method as in claim 22, wherein the reconstruction data includes multiple groupings, each of the multiple groupings of reconstruction data including a set of residual data elements, each set of residual data elements indicating adjustments to be made to corresponding elements of the signal after upsampling of the corresponding elements of the signal from the first level of quality to the second level of quality, each of the multiple groupings supporting a different sub-level of reconstruction quality to reconstruct the rendition of the signal from the first level of quality to the rendition of the signal at the second level of quality.

29. The method as in claim 28, wherein the multiple groupings of reconstruction data includes a first grouping of reconstruction data and a second grouping of reconstruction data, the first grouping of reconstruction data supporting a first sub-level of quality of reconstructing the second rendition of the signal from the first rendition of the signal, the second grouping of reconstruction data supporting a second sub-level of quality of reconstructing the second rendition of the signal from the first rendition of the signal, the first sub-level of quality being higher than the second sub-level of quality.

30. The method as in claim 22, wherein the decoded reconstruction data includes multiple sets of decoded reconstruction data, each of the multiple sets supporting reconstruction of the rendition of the signal at the second level of quality based on the rendition of the signal at the first level of quality;

wherein parameters used to entropy decode each of the multiple sets of reconstruction data are independent with respect to each other; and wherein the entropy decoder utilizes a decoding method selected from the group consisting of:

i) range decoding, ii) run-length decoding, iii) Huffmann decoding, iv) table-based Variable Length decoding.

31. The method as in claim 22, wherein producing the rendition of the signal at the first level of quality includes:

receiving a first set of data;

decoding the first set of data; and utilizing the decoded first set of data to produce the rendition of the signal at the first level of quality; and wherein producing the rendition of the signal at the second level of quality includes:

receiving a second set of data;

decoding the second set of data, the decoded second set of data including residual data element settings, the residual data element settings indicating adjustments to be made with respect to produce the rendition of the signal at the second level of quality;

upsampling the rendition of the signal at the first level of quality to produce a first rendition of the signal at the second level of quality; and applying the adjustments as specified by the residual data element settings to the first rendition of the signal at the second level of quality to generate a second rendition of the signal at the second level of quality.

32. The method as in claim 31 further comprising:

utilizing the second rendition of the signal at the second level of quality to upsample and produce a rendition of the signal at a third level of quality, the third level of quality being higher than the second level of quality in the hierarchy.

33. The method as in claim 22, wherein producing the rendition of the signal at the first level of quality includes:

receiving a first set of data;

decoding the first set of data;

utilizing the decoded first set of data to produce a first rendition of the signal at the first level of quality;

receiving a second set of data;

decoding the second set of data into residual data element settings, the residual data element settings in the second set indicating adjustments to produce the rendition of the signal at the first level of quality; and applying the residual data element settings in the second set to produce the rendition of the signal at the first level of quality; and wherein producing the rendition of the signal at the second level of quality includes:

receiving a third set of data;

decoding the third set of data, the decoded third set of data including residual data element settings, the residual data element settings in the third set indicating adjustments to produce the rendition of the signal at the second level of quality;

upsampling the rendition of the signal at the first level of quality to produce the rendition of the signal at the second level of quality; and applying the adjustments as specified by the residual data element settings in the third set to produce the rendition of the signal at the second level of quality.

34. The method as in claim 33, wherein parameters of upsample operations as specified by the third set of data to produce a first portion of the rendition of the signal at the second level of quality are different from parameters of upsampling operations as specified by the third set of data to produce a second portion of the rendition of the signal at the second level of quality.

35. The method as in claim 22, wherein the encoded reconstruction data specifies operations indicating how to upsample the rendition of the signal at the first level of quality into the rendition of the signal at the second level of quality.

36. The method as in claim 22, wherein the decoded reconstruction data indicates how to upsample the rendition of the signal at the first level of quality to the rendition of the signal at the second level of quality, the method further comprising:

in accordance with the decoded reconstruction data, upsampling the rendition of the signal at the first level of quality to the rendition of the signal at the second level of quality.

37. Computer-readable storage hardware having instructions stored thereon, the instructions, when carried out by a processing device, causing the processing device to perform operations of:

encoding a signal in a hierarchy including multiple levels of quality, the multiple levels of quality including a first level of quality and a second level of quality, the encoding comprising:

processing a rendition of the signal at the second level of quality, the second level of quality higher than the first level of quality in the hierarchy;

producing a rendition of the signal at the first level of quality;

generating reconstruction data, the reconstruction data specifying how to reconstruct, based on the rendition of the signal at the first level of quality, the rendition of the signal at the second level of quality in the hierarchy; and utilizing an entropy encoder to encode the reconstruction data, the entropy encoder producing an encoded value representative of symbols contained in the reconstruction data;

wherein utilizing the entropy encoder includes:

analyzing the reconstruction data to produce decoding information, the decoding information including probability distribution information indicating a probability of the symbols in the reconstruction data; and storing the encoded value and the probability distribution information for subsequent decoding of the encoded value back into the reconstruction data.

38. A computer system comprising:

a processor;

a memory unit that stores instructions associated with an application executed by the processor; and an interconnect coupling the processor and the memory unit, enabling the computer system to execute the application and perform operations of:

encoding a signal in a hierarchy including multiple levels of quality, the multiple levels of quality including a first level of quality and a second level of quality, the encoding comprising:

producing a rendition of the signal at the second level of quality, the second level of quality higher than the first level of quality in the hierarchy;

producing a rendition of the signal at the first level of quality;

generating reconstruction data, the reconstruction data specifying how to reconstruct, based on the rendition of the signal at the first level of quality, the rendition of the signal at the second level of quality in the hierarchy; and utilizing an entropy encoder to encode the reconstruction data, the entropy encoder producing an encoded value representative of symbols contained in the reconstruction data;

wherein utilizing the entropy encoder includes:

analyzing the reconstruction data to produce decoding information, the decoding information including probability distribution information indicating a probability of the symbols in the reconstruction data; and storing the encoded value and the probability distribution information for subsequent decoding of the encoded value back into the reconstruction data.

* * * * *